US 8,116,573 B2

(12) United States Patent  (10) Patent No.: US 8,116,573 B2
Matsui  (45) Date of Patent: Feb. 14, 2012

(54) CATEGORY WEIGHT SETTING APPARATUS AND METHOD, IMAGE WEIGHT SETTING APPARATUS AND METHOD, CATEGORY ABNORMALITY SETTING APPARATUS AND METHOD, AND PROGRAMS THEREFOR

(75) Inventor: Yuko Matsui, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1012 days.

(21) Appl. No.: 11/711,817

(22) Filed: Feb. 28, 2007

(65) Prior Publication Data

US 2007/0208717 A1  Sep. 6, 2007

(30) Foreign Application Priority Data

Mar. 1, 2006 (JP) ................................. 2006-054928
Mar. 1, 2006 (JP) ................................. 2006-054929

(51) Int. Cl.
*G06K 9/62* (2006.01)
*G06K 9/66* (2006.01)
*G06K 9/00* (2006.01)

(52) U.S. Cl. ........ 382/224; 382/159; 382/165; 382/170; 382/225; 382/226; 382/228

(58) Field of Classification Search .................. 382/224, 382/159, 165, 170, 225, 226, 228
See application file for complete search history.

(56) References Cited

U.S. PATENT DOCUMENTS

| | | | |
|---|---|---|---|
| 6,389,181 B2 * | 5/2002 | Shaffer et al. | 382/305 |
| 6,396,963 B2 * | 5/2002 | Shaffer et al. | 382/305 |
| 6,606,411 B1 | 8/2003 | Loui et al. | |
| 6,671,405 B1 * | 12/2003 | Savakis et al. | 382/203 |
| 6,865,297 B2 * | 3/2005 | Loui et al. | 382/224 |
| 6,907,141 B1 * | 6/2005 | Okamoto | 382/225 |
| 7,373,021 B2 * | 5/2008 | Wada | 382/305 |
| 7,630,545 B2 * | 12/2009 | Cieplinski | 382/167 |
| 7,646,893 B2 * | 1/2010 | Yamada et al. | 382/115 |
| 7,675,647 B2 * | 3/2010 | Tsue et al. | 358/1.9 |
| 2003/0093423 A1 * | 5/2003 | Larason et al. | 707/5 |
| 2003/0128877 A1 * | 7/2003 | Nicponski | 382/224 |

(Continued)

FOREIGN PATENT DOCUMENTS

JP  2000-276484  10/2000

(Continued)

OTHER PUBLICATIONS

Japanese Office Action dated Nov. 24, 2010 (with a partial English translation).

(Continued)

*Primary Examiner* — Matthew Bella
*Assistant Examiner* — Michael A Newman
(74) *Attorney, Agent, or Firm* — McGinn IP Law Group, PLLC

(57) ABSTRACT

When images are classified into categories, which of the categories has important images can be understood easily without a burned on a user. For this purpose, a category weight calculation unit statistically calculates a weight of each of the categories obtained by classification of the images, based on at least one of characteristic quantities comprising the number of images therein found by considering similar images therein, a total photography time thereof, a rate of similar images therein, a rate of human images therein, and an average number of human faces therein.

19 Claims, 16 Drawing Sheets

U.S. PATENT DOCUMENTS

| | | |
|---|---|---|
| 2003/0184653 A1 | 10/2003 | Ohkubo |
| 2003/0198390 A1 | 10/2003 | Loui et al. |
| 2004/0208365 A1 | 10/2004 | Loui et al. |
| 2004/0258304 A1* | 12/2004 | Shiota et al. ............... 382/170 |
| 2005/0114325 A1* | 5/2005 | Liu et al. ........................ 707/3 |
| 2005/0128305 A1 | 6/2005 | Hamasaki et al. |
| 2005/0134946 A1* | 6/2005 | Tsue et al. ................ 358/537 |
| 2006/0078201 A1* | 4/2006 | Kim et al. .................... 382/181 |
| 2006/0204143 A1* | 9/2006 | Shiota et al. ................ 382/305 |
| 2006/0222244 A1* | 10/2006 | Haupt et al. ................ 382/220 |
| 2006/0251292 A1* | 11/2006 | Gokturk et al. ............. 382/103 |
| 2007/0097420 A1* | 5/2007 | Shah et al. ................. 358/1.15 |
| 2007/0223811 A1* | 9/2007 | Kudo et al. ................. 382/162 |
| 2007/0271297 A1* | 11/2007 | Jaffe et al. ................. 707/104.1 |
| 2008/0085055 A1* | 4/2008 | Cerosaletti et al. ........... 382/225 |
| 2008/0089561 A1* | 4/2008 | Zhang ........................ 382/118 |

FOREIGN PATENT DOCUMENTS

| | | |
|---|---|---|
| JP | 2003-058867 | 2/2003 |
| JP | 2003-141130 | 5/2003 |
| JP | 2004-120420 | 4/2004 |
| JP | 2004-120420 A | 4/2004 |
| JP | 2005-148900 | 6/2005 |
| JP | 2005-148900 A | 6/2005 |
| JP | 2006-171942 | 6/2006 |

OTHER PUBLICATIONS

Japanese Office Action dated Dec. 28, 2010 (with partial English translation).

Japanese Office Action dated Apr. 5, 2011 (with a partial English translation).

* cited by examiner

CATEGORY WEIGHT SETTING APPARATUS AND METHOD, IMAGE WEIGHT SETTING APPARATUS AND METHOD, CATEGORY ABNORMALITY SETTING APPARATUS AND METHOD, AND PROGRAMS THEREFOR

BACKGROUND OF THE INVENTION

1. Field of the Invention

The present invention relates to a category weight setting apparatus and a category weight setting method for setting a weight of each category obtained by classification of images, to an image weight setting apparatus and an image weight setting method for setting a weight of each of the images, and to programs that cause a computer to execute the category weight setting method and the image weight setting method.

The present invention also relates to a category abnormality setting apparatus and a category abnormality setting method for setting an abnormality of each category obtained by classification of images, and to a program that causes a computer to execute the category abnormality setting method.

2. Description of the Related Art

Following the spread of digital cameras and scanners, anyone can obtain digital images with ease. Images are also input to personal computers and classified. In this case, images are often classified into events related to users. For example, in the case of a trip to Europe, images are firstly classified into categories of countries such as France, the UK, and Spain, and images classified into the category of France are further classified into detailed categories of places visited, such as Paris and Nice. Images classified into the category of Paris are then classified into more detailed categories such as the Eiffel Tower, the Arch of Triumph, and the Notre Dame Cathedral. Images of Notre Dame Cathedral may further be classified into much more detailed categories such as "In Front Of The Cathedral", "Away from The Cathedral", and "Inside The Cathedral".

If images are hierarchically classified into a plurality of categories, the images can be referred to later according to events and can be organized with ease.

On the other hand, users need to carry out hierarchical classification of images while viewing the images and refreshing their memories, which is a troublesome operation for the users.

For this reason, various methods have been proposed for automatically classifying images. For example, a method has been proposed wherein images are arranged along a time axis based on information representing time and date of photography added thereto and the images are classified into predetermined k categories by comparing a threshold value with difference in the time of photography between two of the images neighboring each other on the time axis (k-average clustering method, see Japanese Unexamined Patent Publication No. 2000-112997). Another method has also been proposed for classifying images into categories of events (see Japanese Unexamined Patent Publication No. 2003-141130). In this method, photography frequency is found by adding the number of images having been stored in each predetermined period, based on information on time and date of photography related to the images. The magnitude of the number of images having been photographed in a predetermined period, which is found according to the frequency, is then judged based on a predetermined threshold value. Based on the magnitude, images are classified into categories of events. Furthermore, another method has been proposed for classifying images into categories according to a schedule of a user by referring to schedule information representing the schedule of the user (see U.S. Patent Application Publication No. 20030184653). Still another method of image classification has also been proposed in U.S. Patent Application Publication No. 20050128305. In this method, the distance is calculated between a place of reference and a place of photography of an image by use of position information of the place of photography, and images are classified based on time of photography by changing a threshold value therefor according to the distance.

In addition, a method of calculating weights of images classified into categories has also been proposed in Japanese Patent Application No. 2004-360870. In this method, a weight of each of images classified into each category is calculated based on characteristics of the category such as the number of images therein, the number of images in an upper-level category, the number of related categories, the number of lower hierarchical levels, and the number of hierarchical levels from the uppermost level to the level thereof.

However, in the case where images have automatically been classified as has been described above, users cannot understand which category includes important images unless the users confirm the content of images in the categories.

In addition, in the case where images have been classified in the above manner, the manner of photography may become unnatural due to a relationship between the number of images in each category and the time of photography thereof, for example. The manner of photography becomes unnatural in the case where a large number of images have been photographed in a very short time or in the case where a very small number of images have been photographed in a very long time, for example. These cases occur when images photographed at the same time by a plurality of cameras are stored in the same folder or when some images are deleted after photography. In photography with a digital camera, the same scene is often photographed a plurality of times in case of failure of photography. Therefore, it is natural for the number of groups of images similar to each other to become larger as the number of images increases. However, image classification may be failed as in the case where the number of groups of images similar to each other becomes substantially smaller than the number of images.

If weights are calculated for images classified into categories based on characteristics of the categories such as the number of hierarchical levels as has been described in Japanese Patent Application No. 2004-360870 despite the fact that the images in the categories have not been classified normally due to an unnatural manner of photography or failure of classification, the weights cannot represent true weights.

SUMMARY OF THE INVENTION

The present invention has been conceived based on consideration of the above circumstances, and an object of the present invention is to enable understanding of which category includes important images classified therein without a burden on a user.

Another object of the present invention is to enable easy judgment as to whether images have been classified normally into categories.

If images are classified into categories, many people think that each of the categories is more important as the number of images therein found by considering similar images therein increases. Many people also think that each of the categories is more important as a total photography time thereof, which is represented by a difference in time of photography between the newest image and the oldest image therein, becomes longer. In addition, many people regard that each of the categories is more important as a rate of similar images therein becomes higher. Many people also think that each of the categories is more important as a rate of human images including human faces therein becomes higher. Moreover, many people regard that each of the categories is more important as the number of human faces therein increases. Furthermore, many people regard that each of the images is more important as the number of images similar thereto becomes larger. The present invention has been realized by paying attention to rules determined statistically as has been described above.

In other words, a category weight setting apparatus of the present invention comprises category weight calculation means for statistically calculating a weight of each category obtained by classification of a plurality of images, based on at least one of characteristic quantities comprising the number of images therein found by considering similar images therein, a total photography time thereof, a rate of similar images therein, a rate of human images therein, and an average number of human faces therein.

Calculating the weight statistically from the characteristic quantity or quantities refers to calculating a weighting function inductively by using preferred ones of sample images selected as correct data, instead of calculating the weighting function deductively based on assumptions therefor. The correct data can be selected in any manner. However, it is preferable for the correct data to be selected actually by examinees. It is also preferable for the number of the sample images for finding the weighting function to be larger.

The number of images found by considering similar images refers to a value calculated according to $$M0 + \gamma 0 \times M1$$

where M0 refers to the number of images having no similar images and M1 refers to the number of groups generated by grouping similar images together (hereinafter referred to as similar groups), with $\gamma 0$ being a weight coefficient. The weight coefficient $\gamma 0$ is equal to or larger than 0 and up to the number of similar images. In the case of $\gamma 0$ being 1, the number of images in each of the categories found through consideration of similar images therein is the number of images therein found by considering similar images as one image. More specifically, in the case where a category has 10 images and 5 of the images are similar, the number of images found by considering similar images is 6, since the similar images are regarded as 1 image. In the case of $\gamma 0$ being 1.2, the similar images are regarded as 1.2 images. Therefore, if a category has 10 images and 5 of the images are similar, the number of images found by considering similar images is 6.2, in this case.

The total photography time of each of the categories refers to a difference in photography time between the newest image and the oldest image in each of the categories when the images therein are arranged in order of photography time.

The rate of similar images refers to a value calculated by $$(N0-N1)/N0$$

where N0 and N1 respectively refer to the number of all the images in each of the categories and the number of images therein found by considering similar images therein.

The rate of human images refers to a value found by division of the number of images including a person by the number of all the images in each of the categories.

The average number of human faces in the images in each of the categories refers to a value found by division of the number of human faces included in the images in each of the categories by the number of all the images therein.

In the category weight setting apparatus of the present invention, the category weight calculation means may calculate at least two of the characteristic quantities comprising the number of images therein found by considering similar images therein, the total photography time thereof, the rate of similar images therein, the rate of human images therein, and the average number of human faces therein and may statistically find an individual weight or individual weights corresponding to the characteristic quantity or quantities, based on the characteristic quantity or quantities. The category weight calculation means then calculates the category weight by weighting the individual weight or weights.

A first image weight setting apparatus of the present invention comprises:

category weight calculation means for statistically calculating a weight of each category obtained by classification of a plurality of images; and image weight calculation means for statistically calculating a weight of each of the images included in a targeted one of the categories, based on the number of similar images included therein and the weight thereof.

In the first image weight setting apparatus of the present invention, the image weight calculation means may calculate the weight of each of the images in the target category according to $\alpha n \times$ (the weight of the category)$+\beta n$ where n refers to the number of similar images therein and $\alpha n$ and $\beta n$ are statistically predetermined weight coefficients.

In the first image weight setting apparatus of the present invention, the category weight calculation means may statistically calculate the weight of each of the categories based on at least one of characteristic quantities comprising the number of images therein found by considering similar images therein, a total photography time thereof, a rate of similar images therein, a rate of human images therein, and an average number of human faces therein.

In the first image weight setting apparatus of the present invention, the category weight calculation means may calculate at least two of the characteristic quantities comprising the number of images therein found by considering similar images therein, the total photography time thereof, the rate of similar images therein, the rate of human images therein, and the average number of human faces therein, and may statistically find an individual weight or individual weights corresponding to the characteristic quantity or quantities based on the characteristic quantity or quantities. The category weight calculation means then calculates the category weight by weighting the individual weight or weights, in this case.

A second image weight setting apparatus of the present invention comprises:

classification means for classifying a plurality of images into categories based on accompanying information added to the images;

category weight calculation means for statistically calculating a weight of each of the categories based on a characteristic of the images included therein; and image weight calculation means for statistically calculating a weight of each of the images in a targeted one of the categories, based on the number of similar images included therein and the weight thereof.

In the second image weight setting apparatus of the present invention, the classification means may classify the images into the categories according to date of photography based on information on time and date of photography added to each of the images. In this case, the category weight calculation means may statistically calculate the weight of each of the categories based on at least one of characteristic quantities comprising the number of images therein found by considering similar images therein, a total photography time thereof, a rate of similar images therein, a rate of human images therein, and an average number of human faces therein, and the image weight calculation means may statistically calculate the weight of each of the images in the target category based on the number of similar images therein and the weight thereof.

In the second image weight setting apparatus of the present invention, the image weight calculation means may calculate the weight of each of the images in the target category according to $\alpha n \times$(the weight of the category)$+\beta n$ where n refers to the number of similar images therein and $\alpha n$ and $\beta n$ are statistically predetermined weight coefficients.

The weight of each of the categories and the weight of each of the images may be displayed in a visually recognizable manner.

In order to display the weights in a visually recognizable manner, a folder may be generated for each of the categories and the images are classified by being stored in the folders. When a structure of the folders, that is, a hierarchical structure of the categories is displayed by viewer software or the like, a color of each of the folders may be changed according to the weight of the corresponding category. Alternatively, each of the categories may be ranked according to the weight thereof, and a value representing the rank may be displayed by being added to the corresponding folder.

A category weight setting method of the present invention comprises the step of statistically calculating a weight of each category obtained by classification of a plurality of images, based on at least one of characteristic quantities comprising the number of images therein found by considering similar images therein, a total photography time thereof, a rate of similar images therein, a rate of human images therein, and an average number of human faces therein.

A first image weight setting method of the present invention comprises the steps of:

statistically calculating a weight of each category obtained by classification of a plurality of images; and statistically calculating a weight of each of the images included in a targeted one of the categories, based on the number of similar images included therein and the weight thereof.

A second image weight setting method of the present invention comprises the steps of:

classifying a plurality of images into categories based on accompanying information added to the images;

statistically calculating a weight of each of the categories based on a characteristic of the images included therein; and statistically calculating a weight of each of the images in a targeted one of the categories, based on the number of similar images included therein and the weight thereof.

The category weight setting method and the image weight setting methods of the present invention may be provided as programs that cause a computer to execute the methods.

According to the category weight setting apparatus and the category weight setting method of the present invention, the weight of each of the categories is statistically calculated based on at least one of the characteristic quantities comprising the number of images therein found by considering similar images therein, the total photography time thereof, the rate of similar images therein, the rate of human images therein, and the average number of human faces therein. Therefore, the weight of each of the categories, which is determined statistically, can be found without a burden on a user.

According to the first image weight setting apparatus and the first image weight setting method of the present invention, the weight is calculated for each of the categories obtained by classification of the images, and the weight of each of the images in the target category is statistically calculated based on the number of similar images therein and the weight thereof. Therefore, the weight of each of the images in the target category, which is determined statistically, can be understood without a burden on a user.

According to the second image weight setting apparatus and the second image weight setting method of the present invention, the images are classified into the categories based on the accompanying information thereof, and the weight of each of the categories is found statistically. The weight of each of the images in the target category is then found based on the number of similar images therein and the weight thereof. Therefore, the weight of the category and the weight of each of the images therein, which are determined statistically, can be understood without a burden on a user.

In the case where images are classified into categories, a study carried out by the applicants reveals that a relationship of any one of the number of images in each of the categories, the number of images therein found by considering similar images therein, the number of categories related thereto, and the number of hierarchical levels to a total photography time thereof or to a rate of similar images therein shows a statistical distribution with a rule depending on whether classification of the images has been carried out normally. The present invention has been conceived by paying attention to this fact.

In other words, a category abnormality setting apparatus of the present invention comprises category abnormality calculation means for calculating an abnormality of each category obtained by classification of a plurality of images, based on a statistical abnormality distribution in a relationship of any one of the number of images therein, the number of images therein found by considering similar images therein, the number of categories related thereto, and the number of hierarchical levels to a total photography time thereof and/or to a rate of similar images therein.

The abnormality of each of the categories represents a degree of unnatural manner of photography or a degree of failure of image classification into the category. More specifically, the degree of unnatural manner of photography can be found as the abnormality by referring to a statistical abnormality distribution in a two-dimensional coordinate system defining a relationship between a total time of photography of the category and any one of the number of images therein, the number of images therein found by considering similar images therein, the number of categories related thereto, and the number of hierarchical levels. In addition, the degree of failure of image classification can be found as the abnormality by referring to a statistical abnormality distribution in a two-dimensional coordinate system defining a relationship between a rate of similar images in each of the categories and any one of the number of images therein, the number of images therein found by considering similar images therein, the number of categories related thereto, and the number of hierarchical levels.

As the abnormality of each of the categories may be used either the degree of unnatural manner of photography or the degree of failure of image classification. Alternatively, both the degrees may be used.

The term "statistically" refers to a manner of inductively finding the relationship of the total time of photography of the category and/or the rate of similar images therein to any one of the number of images therein, the number of images therein found by considering similar images therein, the number of categories related thereto, and the number of hierarchical levels by using preferred ones of sample images selected as correct data, instead of finding the relationship deductively based on assumptions therefor. The correct data may be selected in any manner. However, it is preferable for the correct data to be actually selected by examinees. It is also preferable for the number of the sample images for selecting the correct data to be larger.

The number of images found by considering similar images refers to a value calculated according to $$M0 + \gamma 0 \times M1$$

where M0 refers to the number of images having no similar images and M1 refers to the number of groups generated by grouping similar images together (hereinafter referred to as similar groups), with γ0 being a weight coefficient. The weight coefficient γ0 is equal to or larger than 0 and up to the number of similar images. In the case of γ0 being 1, the number of images in each of the categories found through consideration of similar images therein is the number of images therein found by considering similar images as one image. More specifically, in the case where a category has 10 images and 5 of the images are similar, the number of images found by considering similar images is 6, since the similar images are regarded as 1 image. In the case of γ0 being 1.2, the similar images are regarded as 1.2 images. Therefore, if a category has 10 images and 5 of the images are similar, the number of images found by considering similar images is 6.2, in this case.

The related categories refer to upper and/or lower level categories in the case where the categories are classified hierarchically.

The total photography time of each of the categories refers to a difference in photography time between the newest image and the oldest image in each of the categories when the images therein are arranged in order of photography time.

The rate of similar images refers to a value calculated by $$(N0-N1)/N0$$

where N0 and N1 respectively refer to the number of all the images in each of the categories and the number of images therein found by considering similar images therein.

In the category abnormality setting apparatus of the present invention, the category abnormality calculation means may classify each of the categories as a normal category or an abnormal category by comparing the abnormality thereof with a predetermined threshold value.

In this case, if the categories are in a hierarchy, the category abnormality setting apparatus may further comprise category weight calculation means for calculating a category weight of an uppermost-level category based on a characteristic of the category and for calculating a category weight of a lower-level category other than the uppermost-level category based on a characteristic of the category in the case where the uppermost-level category is the normal category or for setting a predetermined value as the category weight of the lower-level category in the case where the uppermost-level category is the abnormal category.

In order to calculate the category weight based on the characteristic thereof, the method described in Japanese Patent Application No. 2004-360870 may be used, for example. More specifically, a weight of each of the categories can be calculated based on the characteristic thereof, such as the number of images therein, the number of images in an upper-level category the number of categories related thereto, the number of lower hierarchical levels, and the number of hierarchical levels from the uppermost level to the level thereof.

The category abnormality setting apparatus of the present invention may further comprise:

certainty calculation means for statistically calculating a certainty of the abnormality for each of the categories;

category weight calculation means for calculating a weight of each of the categories based on a characteristic thereof; and output means for outputting the weight together with the certainty.

The certainty of the abnormality for each of the categories represents how much a result of image classification into the category is reliable. More specifically, if the abnormality is high, image classification into the category is not trustworthy. Therefore, by referring to a statistical relationship between the abnormality and the certainty, the certainty can be calculated.

A category abnormality setting method of the present invention comprises the step of calculating an abnormality of each category obtained by classification of a plurality of images, based on a statistical abnormality distribution in a relationship of any one of the number of images therein, the number of images therein found by considering similar images therein, the number of categories related thereto, and the number of hierarchical levels to a total photography time thereof and/or to a rate of similar images therein.

The category abnormality setting method of the present invention may be provided as a program that causes a computer to execute the method.

According to the category abnormality setting apparatus and the category abnormality setting method of the present invention, the abnormality of each of the categories is found with reference to the statistical abnormality distribution in the relationship of the total time of photography thereof and/or the rate of similar images therein to any one of the number of images therein, the number of images therein found by considering similar images therein, the number of categories related thereto, and the number of hierarchical levels. Therefore, whether the images have been classified normally in each of the categories can be easily judged.

By classifying each of the categories as the normal category or the abnormal category through comparison of the abnormality thereof with the predetermined threshold value, whether the images have been classified normally in each of the categories can be judged more easily.

In the case where the categories have a hierarchical structure, the category weight of the uppermost-level category is calculated based on the characteristic thereof. The category weight of the lower-level category other than the uppermost-level category is then calculated based on the characteristic thereof if the uppermost-level category is the normal category while the predetermined value is used as the category weight thereof if the uppermost-level category is the abnormal category. In this manner, the weight of each of the categories can be calculated by reflecting a state of image classification therein.

By outputting the category weight together with the certainty after statistical calculation of the certainty of the category abnormality and calculation of the category weight based on the characteristic of each of the categories, how reliable the calculated category weight is can be easily understood.

DESCRIPTION OF THE PREFERRED EMBODIMENTS

Figure 1:
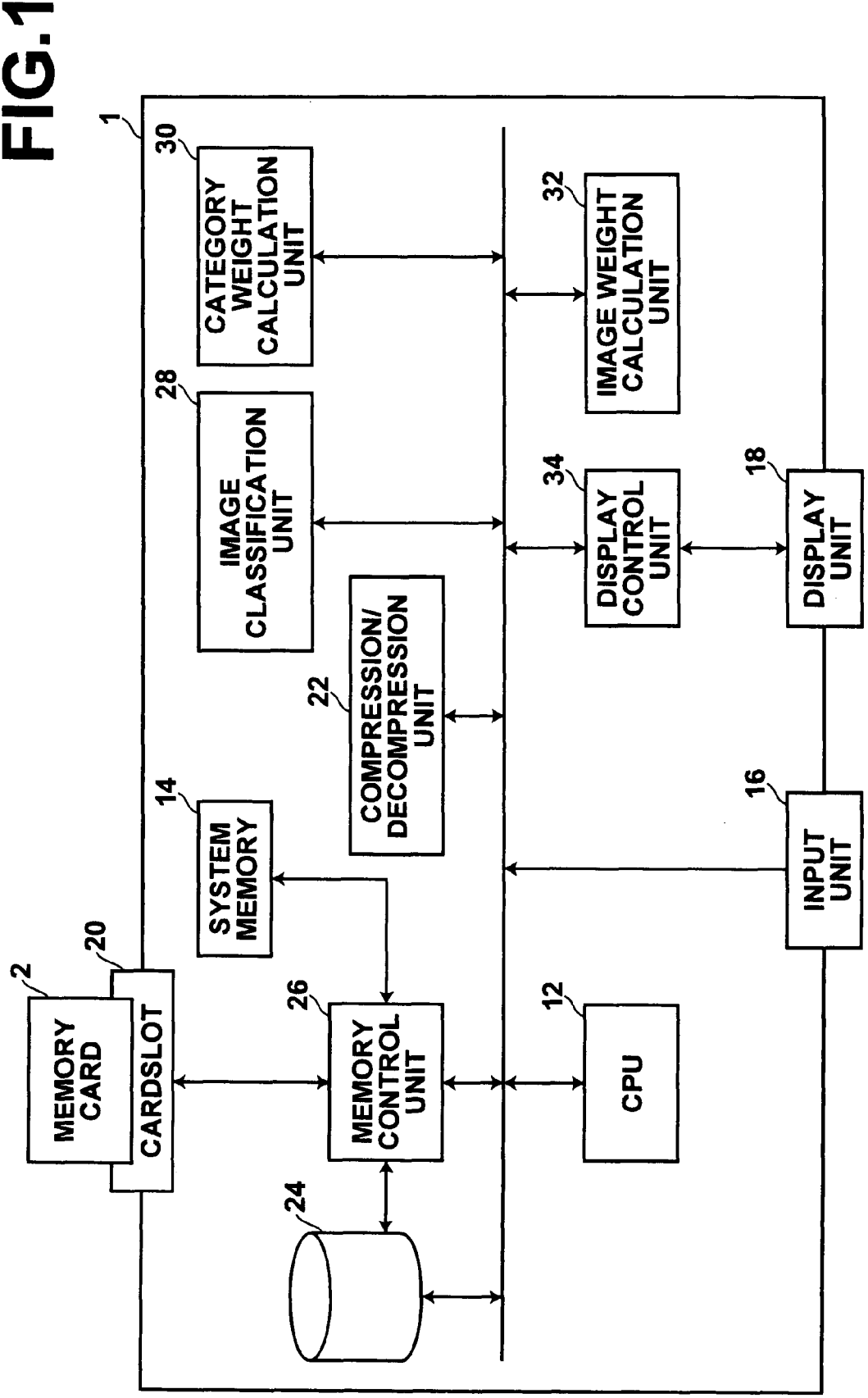
FIG. 1 is a block diagram showing the configuration of a weight setting apparatus of a first embodiment of the present invention.

Hereinafter, embodiments of the present invention will be described with reference to the accompanying drawings. FIG. 1 is a block diagram showing the configuration of a weight setting apparatus of a first embodiment of the present invention. As shown in FIG. 1, a weight setting apparatus 1 in the first embodiment comprises a CPU 12, a system memory 14, an input unit 16, and a display unit 18. The CPU 12 carries out various kinds of control such as recording control and display control of image data, and controls each unit of the apparatus 1. The system memory 14 has a ROM storing a program that causes the CPU 12 to operate, viewer software for image viewing, and various kinds of constants. The system memory 14 also has a RAM used as workspace for processing by the CPU 12. The input unit 16 comprises a keyboard, a mouse, and the like for inputting various kinds of instructions to the apparatus 1. The display unit 18 comprises a liquid crystal monitor or the like for various kinds of display.

The weight setting apparatus 1 also has a card slot 20 for reading image data from a memory card 2 and for recording image data in the memory card 2, a compression/decompression unit 22 for compressing image data according to a format such as JPEG and for decompressing compressed image data, a hard disc 24 for storing image data, various kinds of programs executed by the CPU 12, and weighting tables that will be described later, and a memory control unit 26 for controlling the system memory 14, the card slot 20, and the hard disc 24.

The weight setting apparatus 1 further comprises an image classification unit 28 for classifying images stored in a folder desired by a user in the hard disc 24 into categories, a category weight calculation unit 30 for calculating a weight of each of the categories, and an image weight calculation unit 32 for calculating a weight of each of the images classified into each of the categories. The weight setting apparatus 1 also has a display control unit 34 for controlling display on the display unit 18.

Figure 2:
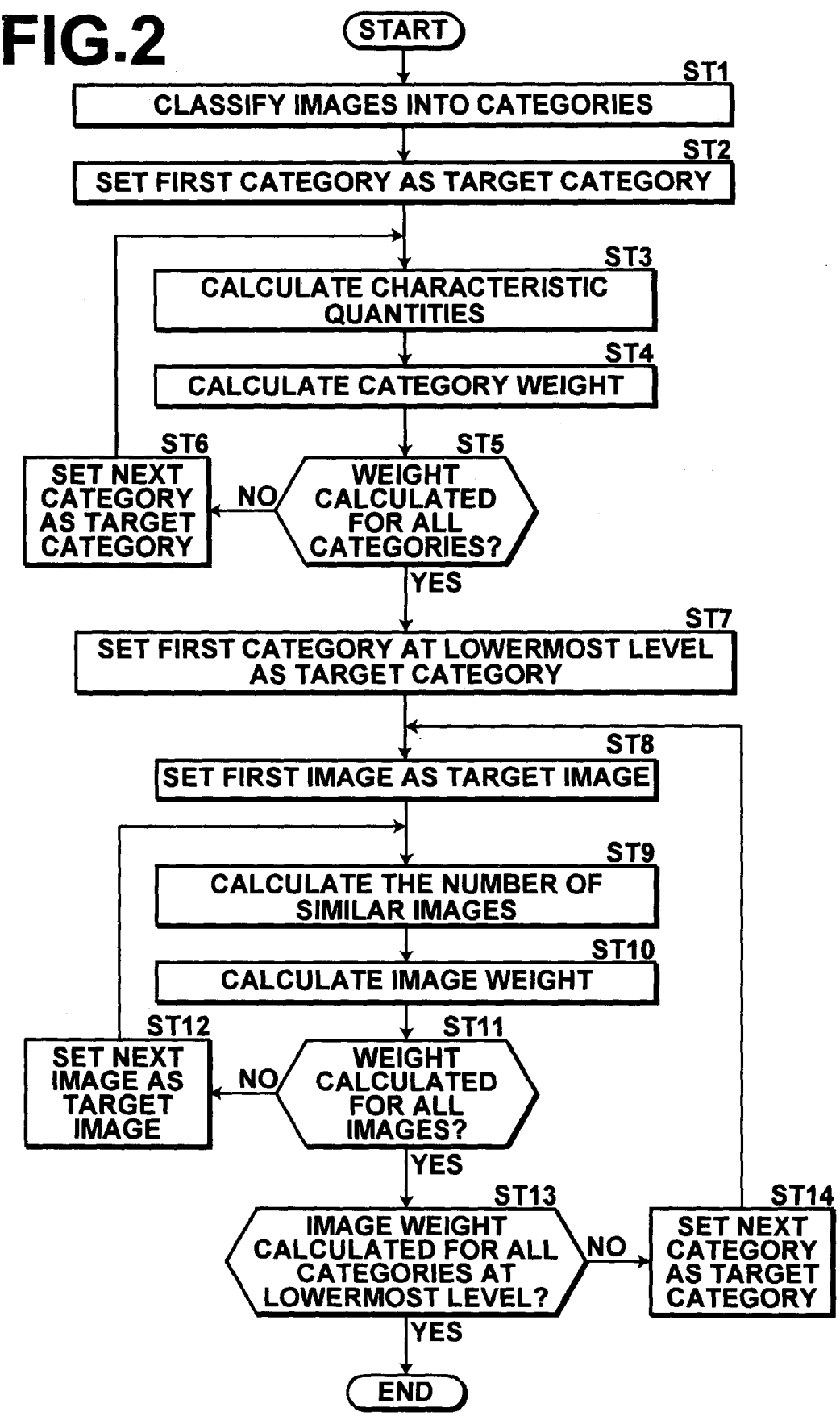
FIG. 2 is a flow chart showing procedures carried out in the first embodiment.

Hereinafter, procedures carried out by the image classification unit 28, the category weight calculation unit 30, and the image weight calculation unit 32 will be described. FIG. 2 is a flow chart showing the procedures in the first embodiment. The image data have been read from the memory card 2 and stored in the folder desired by the user. The CPU 12 starts processing when an instruction to set the weights is input by the user from the input unit 16. The image classification unit 28 classifies the images into the categories (Step ST1).

More specifically, the image classification unit 28 classifies the images according to date of photography based on information on time and date of photography described in tag information of the images, and compares a difference in the time of photography of the images with a threshold value. The image classification unit 28 then classifies the images into the categories of a hierarchical structure by bracketing the images between positions where the difference in the photography time between two of the images neighboring each other exceeds the threshold value.

The category weight calculation unit 30 then sets as a target category the first category in which the image having the oldest photography time and date is stored at the uppermost level in a result of the classification by the image classification unit 28 (Step ST2), and calculates characteristic quantities of the target category (Step ST3). In this embodiment, the category weight calculation unit 30 calculates the number of images in the target category found by considering similar images therein, a total photography time thereof, a rate of similar images therein, a rate of human images therein, and an average number of human faces therein as 5 characteristic quantities. Hereinafter, calculation of the respective characteristic quantities will be described. In this embodiment are processed all the categories having been classified hierarchically by the image classification unit 28.

The category weight calculation unit 30 firstly calculates the number of images in the target category found by considering similar images therein, as a first characteristic quantity T1. For this reason, the category weight calculation unit 30 carries out similar image judgment processing wherein a correlation value is found between each combination of the images and the images in the combination are judged to be similar if the correlation value exceeds a predetermined threshold value. Any known method therefor can be used. By regarding the images that have been judged to be similar as one image in the category, the number of images found by considering similar images can be calculated for the category.

Figure 3:
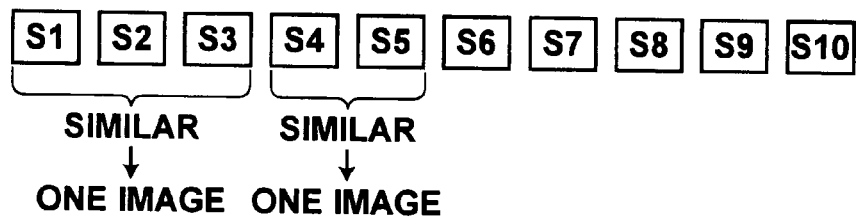
FIG. 3 explains calculation of the number of images found by considering similar images.

FIG. 3 explains the calculation of the number of images found by considering similar images. In the target category having 10 images S1~S10 arranged in order of photography time and date as shown in FIG. 3, in the case where the images S1 to S3 as well as the images S4 and S5 are similar but the images S6 to S10 are not similar, the number of images not having any similar images (hereinafter denoted by M0) is 5 and the number of groups bracketing the similar images together (hereinafter referred to as similar groups and denoted by M1) is 2. The category weight calculation unit 30 calculates the number of images found by considering similar images according to the following Equation (1) by using the values of M0 and M1:

The number of images found by considering similar images $$= M0 + \gamma 0 \times M1 \quad (1)$$

where $\gamma 0$ is a weight coefficient equal to or larger than 0 and equal to or smaller than the number of similar images. If $\gamma 0=1$, the number of images found by considering similar images in the category is the number of images found by considering the similar images as one image. More specifically, if M0=5 and M1=2, the number of images in the category found by considering similar images therein is 7, in this case. If $\gamma 0=1.2$, the similar images are regarded as 1.2 images. Therefore, the number of images found by considering similar images is 7.4, in this case.

The category weight calculation unit 30 also finds the total photography time of the category as a second characteristic quantity T2. The total photography time is found by calculating the difference in photography time between the oldest image and the newest image in the category. More specifically, for the images classified as shown in FIG. 3, the total photography time can be found by calculating the difference between the image S1 and the image S10. The information on time and date of photography described in the tag information of the respective images can be used as the photography time for the calculation.

The category weight calculation unit 30 further finds the rate of similar images in the category as a third characteristic T3. The rate of similar images can be found according to Equation (2) below where N0 and N1 respectively refer to the number of all the images therein and the number of images found by considering similar images:

$$\text{Rate of similar images} = (N0-N1)/N0 \quad (2)$$

For the images shown in FIG. 3, if $\gamma 0=1$ in Equation (1) above, the rate of similar images is (10−7)/10=0.3 for the category. The rate of similar images may be represented as a percentage.

In addition, the category weight calculation unit 30 calculates the rate of human images as a fourth characteristic quantity T4. The rate of human images is calculated through division of the number of images including a person by the number of all the images in the category. Whether a person is included can be judged by presence of a human face. For example, for the images classified as shown in FIG. 3, if the images S1 to S8 represent people included therein while the images S9 and S10 do not, the rate of human images is 0.8 for the category. The rate of human images may be represented as a percentage. Inclusion of a human face can be judged by any known method such as judgment of a skin-color area in a shape of human face.

Moreover, the category weight calculation unit 30 finds the average number of human faces in the category as a fifth characteristic quantity T5. The average number of human faces is found through calculation of the number of all human faces in the images in the category followed by division of the number by the number of all the images in the category. For example, in the images classified as shown in FIG. 3, if the images S1 to S3, the images S4 and S5, and the images S6 to S8 respectively have 2, 3, and 1 human face or faces while the images S9 and S10 do not, the number of all human faces is 6+6+3=15 for the category. Therefore, the average number of human faces is 1.5 for the category.

The category weight calculation unit 30 then statistically calculates the category weight based on the characteristic quantities T1 to T5 (Step ST4). Hereinafter, calculation of the category weight will be described.

In this embodiment, the hard disc 24 stores weighting tables respectively defining relationships between the characteristic quantities T1 to T5 and individual weights therefor. The respective weighting tables define respective relationships between the characteristic quantities T1 to T5 and the number of preferred images selected by examinees from sample images having various values of T1 to T5, in two-dimensional coordinate systems wherein maximum values of the selected images have been normalized to predetermined values.

FIGS. 4 to 8 show first to fifth weighting tables LUT1 to LUT5 for finding the weights respectively for the number of images found by considering similar images, for the total photography time, for the rate of similar images, for the rate of human images, and for the average number of human faces.

The first to fifth weighting tables LUT1 to LUT5 shown in FIGS. 4 to 8 respectively represent the relationships between the characteristic quantity T1 and a weight J1, between the characteristic quantity T2 and a weight J2, between the characteristic quantity T3 and a weight J3, between the characteristic quantity T4 and a weight J4, and between the characteristic quantity T5 and a weight J5.

The category weight calculation unit 30 calculates the weights J1 to J5 for the respective characteristic quantities T1 to T5, by referring to the first to fifth weighting tables LUT1 to LUT5.

Figure 4:
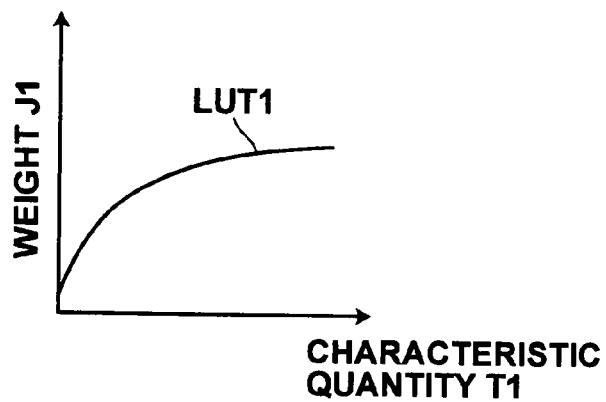
FIG. 4 shows a first weighting table for finding a weight for the number of images found by considering similar images.
Figure 5:
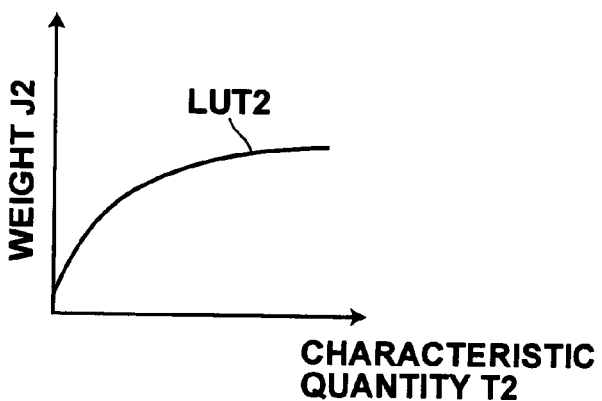
FIG. 5 shows a second weighting table for finding a weight for a total photography time.
Figure 6:
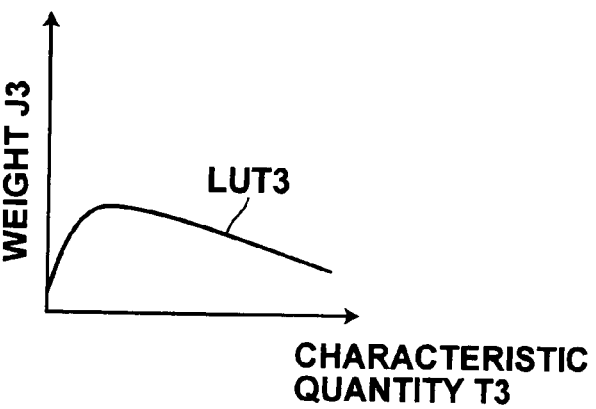
FIG. 6 shows a third weighting table for finding a weight for a rate of similar images.
Figure 7:
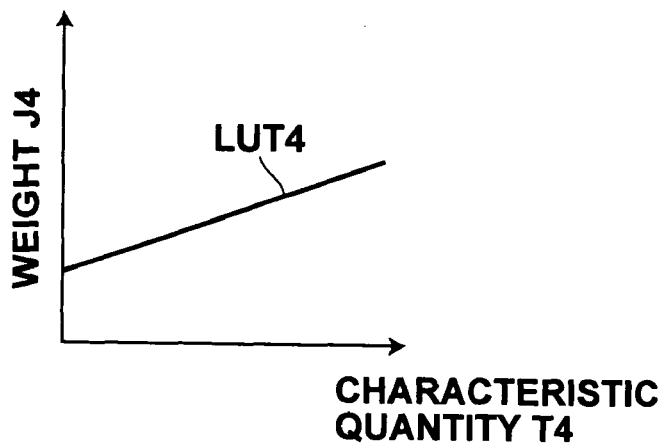
FIG. 7 shows a fourth weighting table for finding a weight for a rate of human images.
Figure 8:
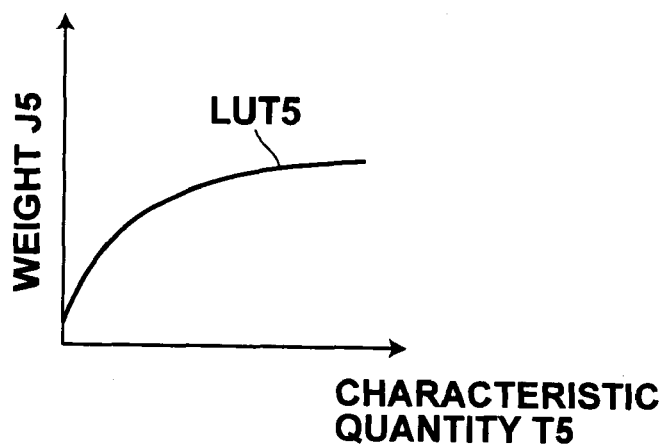
FIG. 8 shows a fifth weighting table for finding a weight for an average number of human faces.

In the first and second weighting tables LUT1 and LUT2 shown in FIGS. 4 and 5, the weights J1 and J2 can be found accurately by adopting logarithmic axes only for the horizontal axes therein.

The category weight calculation unit 30 finds a category weight J0 for the target category by weighting the weights J1 to J5 by weight coefficients a1 to a6 according to Equation (3) below:

$$J0 = a1 \times J1 + a2 \times J2 + a3 \times J3 + \quad (3)$$
$$a4 \times J4 + a5 \times J5 + a6 \times J1 \times J2 \times J3 \times J4 \times J5$$

The weight coefficients a1 to a6 may be found experimentally or according to the characteristic quantity or quantities to be emphasized.

The category weight calculation unit 30 judges whether the weight has been calculated for all the categories (Step ST5). If a result at Step ST5 is negative, the next category is set as the target category (Step ST6), and the flow of processing returns to Step ST3. Thereafter, the procedures from Step ST3 are repeated.

If the result at Step ST5 is affirmative, the image weight calculation unit 32 calculates an image weight as a weight of each of the images classified in each of lowermost-level categories. Hereinafter, calculation of the image weight will be described. The image weight calculation unit 32 sets a first category in the lowermost-level categories as a target category (Step ST7), and sets a first image (such as the image having the newest photography time and date) in the target category as a target image (Step ST8). The image weight calculation unit 32 then calculates the number of images similar to the target image in the target category (Step ST9). For example, for the images classified as shown in FIG. 3, if the target image is S1, the number of similar images is 3.

The image weight calculation unit 32 then finds an image weight G0 according to Equation (4) below:

$$G0 = \alpha n \times J0 + \beta n \qquad (4)$$

where n refers to the number of images similar to the target image while $\alpha n$ and $\beta n$ refer to weight coefficients that are found statistically. The coefficient $\alpha n$ is a coefficient for weighting the category weight J0, and the coefficient $\beta n$ is a coefficient for weighting according to the number of similar images regardless of the category weight J0. In this embodiment, the hard disc 24 stores weighting tables respectively defining relationships between the number n of similar images and the weight coefficients $\alpha n$ and $\beta n$. The image weight calculation unit 32 finds the coefficients $\alpha n$ and $\beta n$ by referring to the weighting tables.

Figure 9:
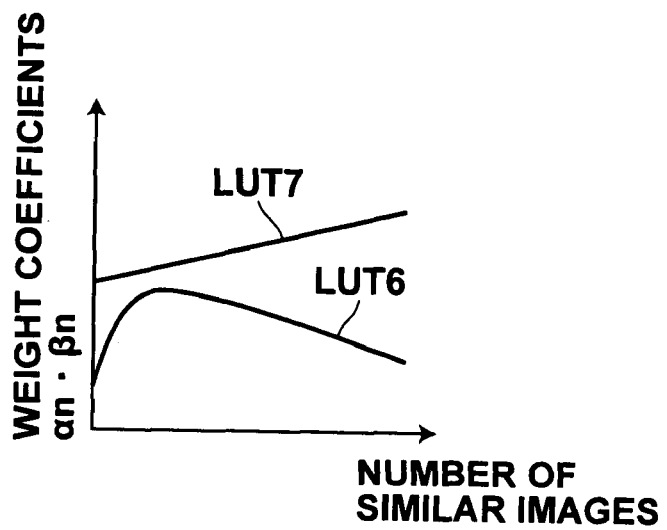
FIG. 9 shows sixth and seventh weighting tables for finding weight coefficients αn and βn.

FIG. 9 shows sixth and seventh weighting tables LUT6 and LUT7 for finding the weight coefficients $\alpha n$ and $\beta n$, respectively. The sixth table LUT6 shown in FIG. 9 represents the relationship between the number n of similar images and the weight coefficient $\alpha n$ while the seventh table LUT7 represents the relationship between the number n of similar images and the weight coefficient $\beta n$. The sixth table LUT6 for the weight coefficient $\alpha n$ defines the relationship between the number n of similar images and the number of preferred images selected by examinees from sample images having various values of n, in a two-dimensional coordinate system wherein a maximum value of the selected images has been normalized to a predetermined value. The weight coefficient $\beta n$ is a function that increases monotonically. However, a function that takes a predetermined value regardless of the number n may be adopted instead.

The image weight calculation unit 32 finds the weight G0 of the target image with reference to the sixth and seventh weighting tables LUT6 and LUT7 (Step ST10).

The image weight calculation unit 32 then judges whether the image weight G0 has been calculated for all the images in the target category (Step ST11). If a result at Step ST11 is negative, the next image is set as the target image (Step ST12), and the flow of processing returns to Step ST9. Thereafter, the procedures from Step ST9 are repeated.

If the result at Step ST11 is affirmative, the image weight calculation unit 32 judges whether the image weight has been calculated for all the categories at the lowermost level (Step ST13). If a result at Step ST13 is negative, the next category at the lowermost level is set as the target category (Step ST14), and the flow of processing returns to Step ST8. Thereafter, the procedures from Step ST8 are repeated. If the result at Step ST13 is affirmative, the procedures end.

Figure 10:
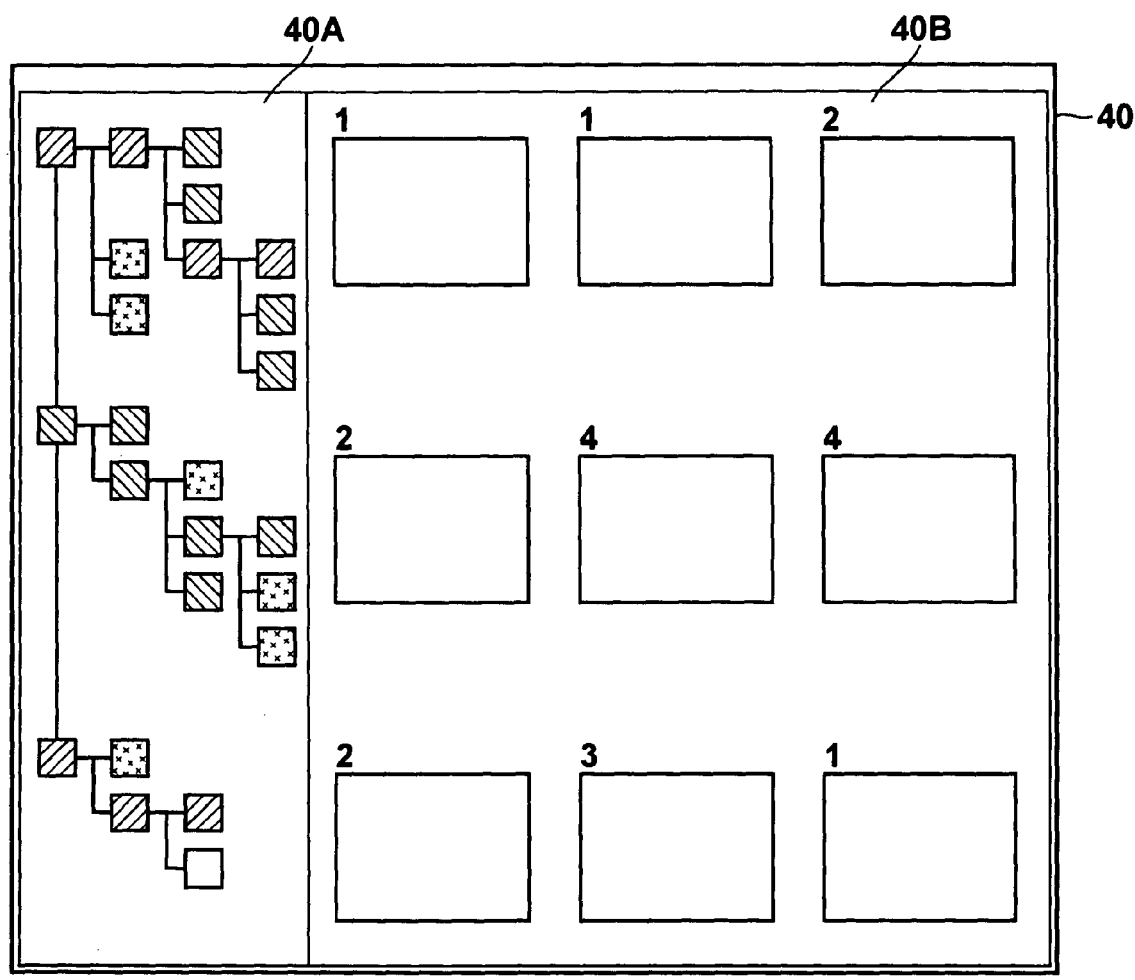
FIG. 10 shows an example of an image catalog screen in the first embodiment.

After the category weight J0 and the image weight G0 have been calculated as has been described above, the display control unit 34 displays on the display unit 18 an image catalog screen wherein the weight J0 set by the category weight calculation unit 30 can be recognized visually. FIG. 10 shows an example of the image catalog screen. As shown in FIG. 10, an image catalog screen 40 has a folder area 40A showing a structure of folders stored in the hard disc 24 and a catalog display area 40B wherein a catalog of thumbnails are displayed regarding the images stored in one of the folders selected in the folder area 40A.

The hierarchical structure of the folders corresponding to the categories classified in the above manner is shown in the folder area 40A. The display control unit 34 ranks the categories $1^{st}$ to $4^{th}$ according to the weight thereof calculated by the category weight calculation unit 30, and displays the folder structure in the folder area 40A by coloring the folders according to the ranks. For example, the folders ranked $1^{st}$ are colored in pink while the folders ranked $2^{nd}$ are colored in orange. Likewise, the $3^{rd}$ place folders are shown in yellow while the $4^{th}$ place folders are displayed in green.

By selecting a desired one of the folders in the folder area 40A, the catalog of the thumbnails of the images classified in the selected folder can be displayed in the catalog display area 40B. In the catalog display area 40B, a rank of each of the images is displayed on the upper left of the corresponding thumbnail according to the weight thereof.

Figure 11:
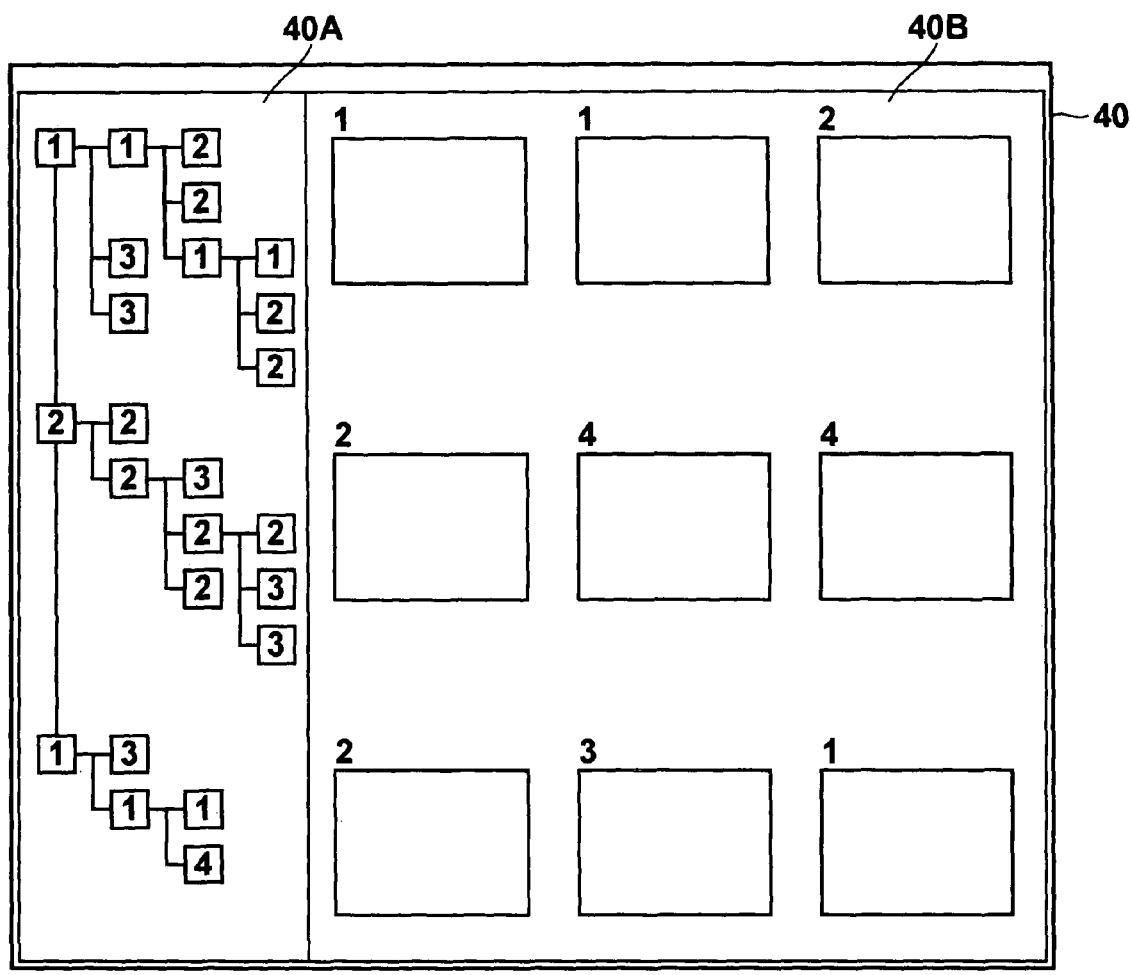
FIG. 11 shows another example of the image catalog screen in the first embodiment.

Not only coloring according to the weight may be used for display, as shown in FIG. 10 but also the ranks as values as shown in FIG. 11. In addition, a mark or graph according to the weight of each of the categories or the images may also be displayed.

As has been described above, in this embodiment, the weight J0 of each of the categories is set statistically based on the 5 characteristic quantities T1 to T5, namely the number of images therein found by considering similar images therein, the total photography time thereof, the rate of similar images therein, the rate of human images therein, and the average number of human faces therein. Therefore, the weight of each of the categories that is determined statistically can be understood without a burden on the user.

In addition, the weight G0 of each of the images in the target category is set statistically according to the number n of similar images therein and the weight J0 thereof. Therefore, the weight of each of the images classified into the categories, which is determined statistically, can be understood without a burden on the user.

In the embodiment described above, the weight of each of the categories is found based on the 5 characteristic quantities T1 to T5, namely the number of images therein found by considering similar images therein, the total photography time thereof, the rate of similar images therein, the rate of human images therein, and the average number of human faces therein. However, not all of the 5 characteristic quantities are necessarily used, and the weight of each of the categories may be found by use of at least one of the 5 characteristic quantities T1 to T5.

Figure 12:
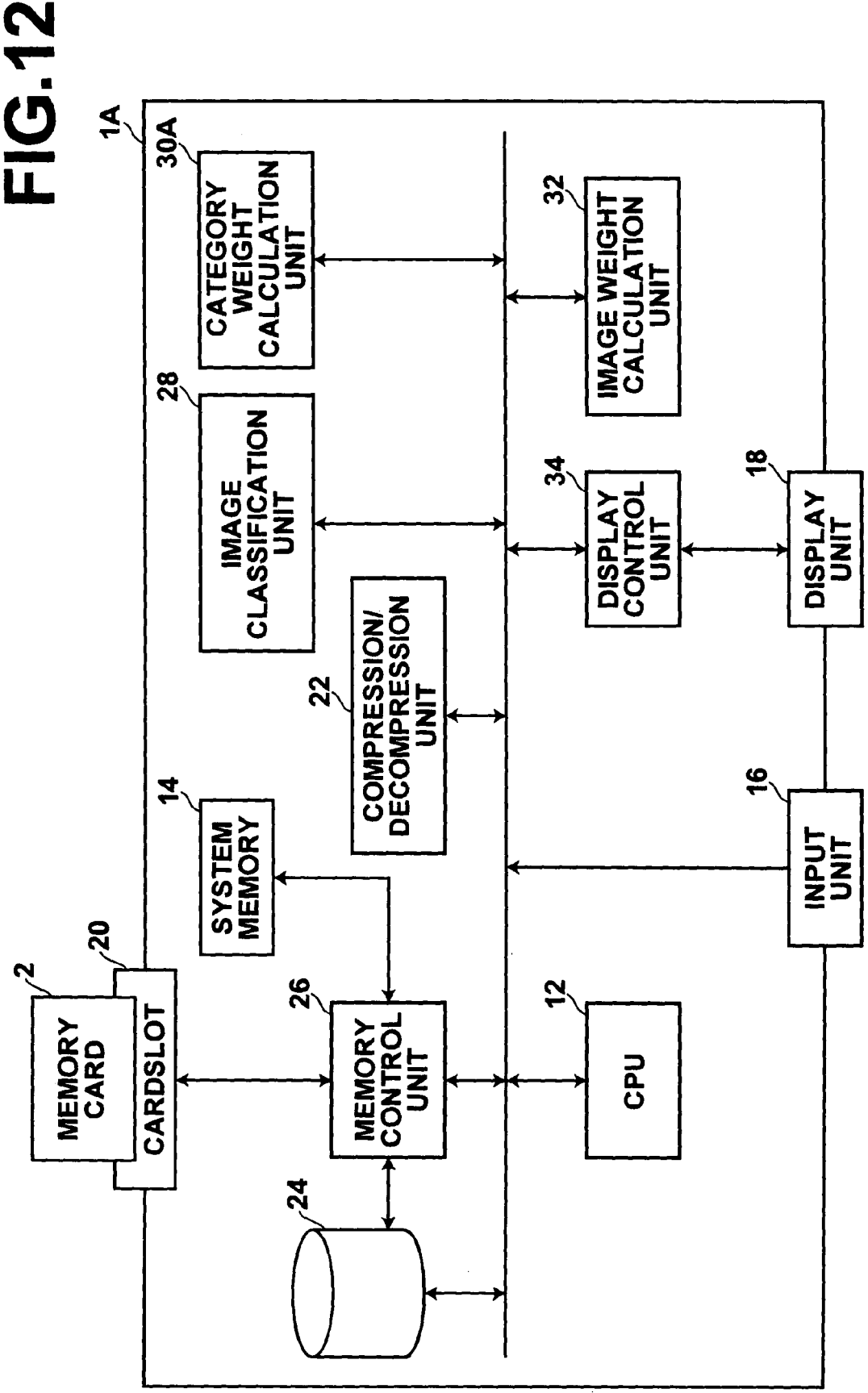
FIG. 12 is a block diagram showing the configuration of a weight setting apparatus of a second embodiment of the present invention.

A second embodiment of the present invention will be described next. FIG. 12 is a block diagram showing the configuration of a weight setting apparatus of the second embodiment of the present invention. In the second embodiment, the same elements as in the first embodiment have the same reference codes, and detailed description thereof is omitted. A weight setting apparatus 1A in the second embodiment has a category weight calculation unit 30A for calculating a category weight according to a method different from the first embodiment.

The category weight calculation unit 30A in the weight setting apparatus 1A in the second embodiment calculates, as a characteristic quantity or characteristic quantities, at least one of the number of images in each category, the number of images in an upper-level category, the number of categories related thereto, the number of lower-level categories, and the number of levels from an uppermost level to the level thereof. The weight of each of the categories is then calculated by weighted addition of each of the characteristic quantity or quantities. The weight of each of the categories may be calculated for combinations of the characteristic quantity or quantities and the 5 characteristic quantities T1 to T5, namely the number of images therein found by considering similar images therein, the total photography time thereof, the rate of similar images therein, the rate of human images therein, and the average number of human faces therein.

By calculating the weight of each of the categories in this manner, an image weight calculation unit 32 can calculate a weight of each of the images in the same manner as in the first embodiment. In this manner, the statistically determined weight of each of the categories and the statistically determined weight of each of the images therein can be understood without a burden on a user.

In the above embodiments, the images are classified into the categories by use of the information on time and date of photography of the images. However, in the case of photography with a camera that can obtain GPS information representing the latitude and longitude of a photography location, images has GPS information added thereto. In this case, the images may be classified hierarchically into categories according to the photography location, based on the GPS information. Alternatively, the classification may be carried out according to the same method as in Japanese Unexamined Patent Publication No. 2000-112997, 2003-141130, U.S. Patent Application Publication No. 20030184653, or U.S. Patent Application Publication No. 20050128305. Furthermore, a user may manually classify images according to his/her preference.

Figure 13:
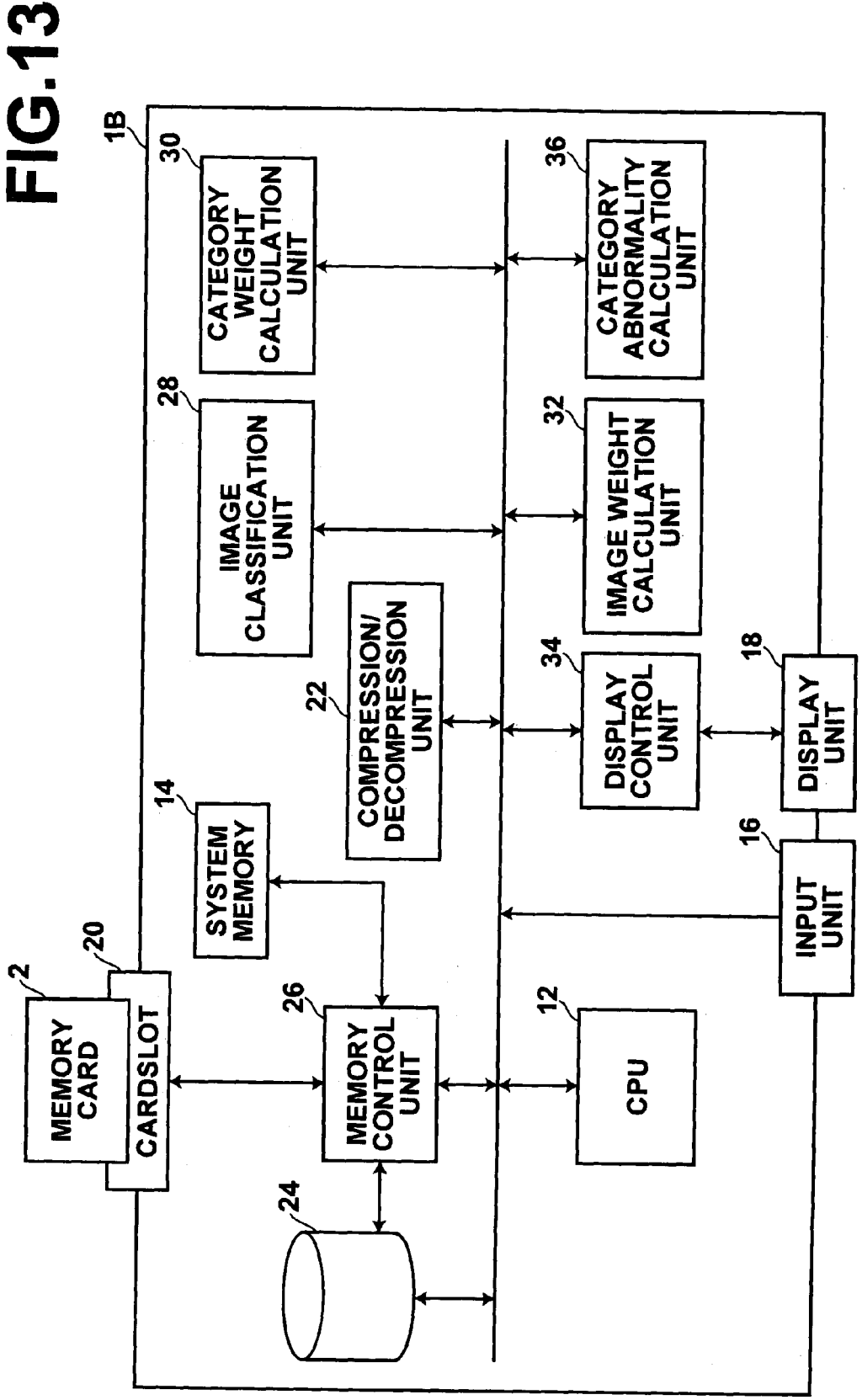
FIG. 13 is a block diagram showing the configuration of a weight setting apparatus of a third embodiment of the present invention.

An embodiment of a category abnormality setting apparatus will be described next. FIG. 13 is a block diagram showing the configuration of a weight setting apparatus adopting a category abnormality setting apparatus of a third embodiment of the present invention. In the third embodiment, the same elements as in the first embodiment have the same reference codes, and detailed description thereof is omitted.

A weight setting apparatus 1B in the third embodiment has a category abnormality calculation unit 36 for calculating an abnormality of classification for each category.

Figure 14:
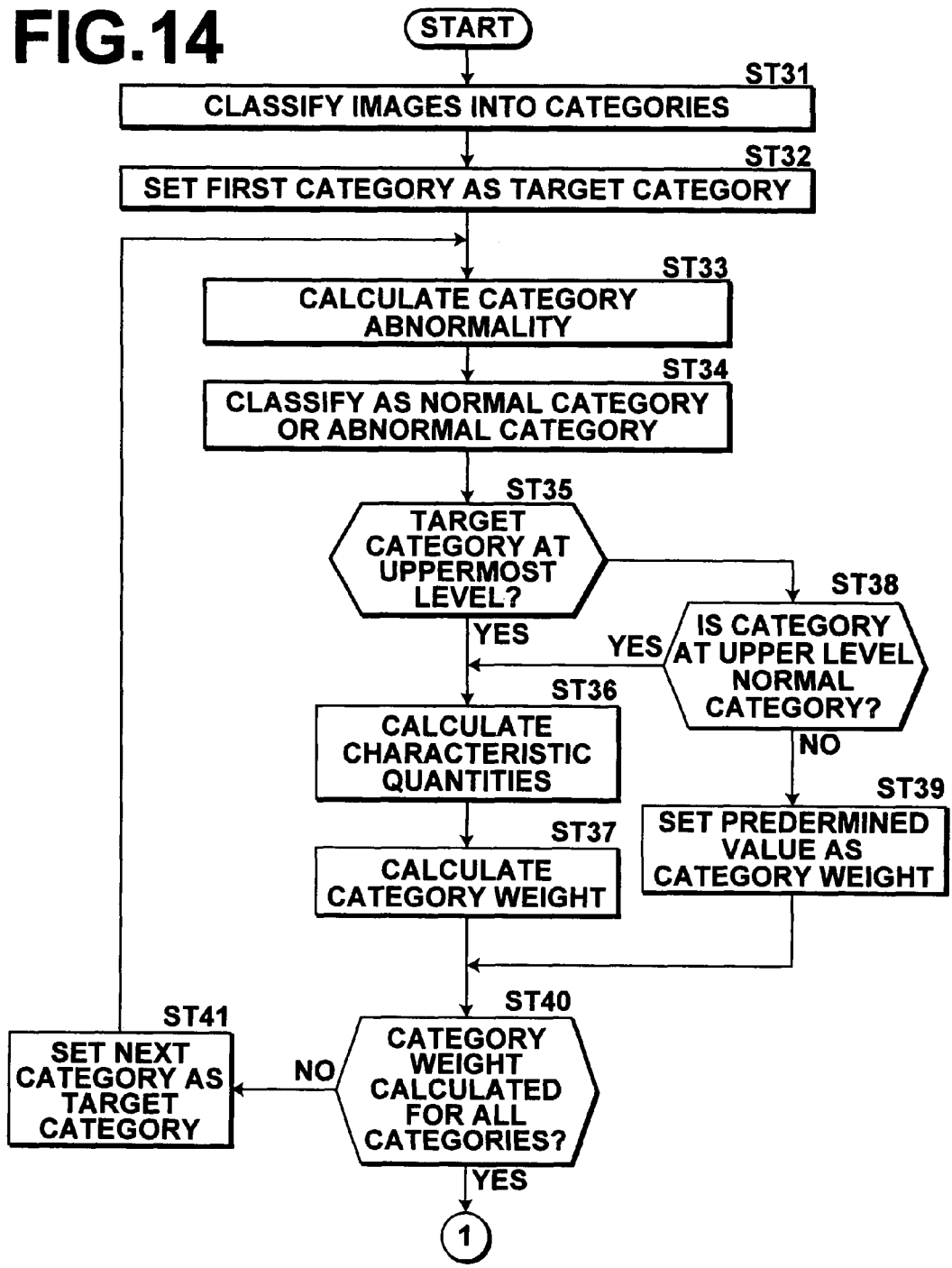
FIG. 14 is a flow chart showing procedures carried out in the third embodiment (part 1)
Figure 15:
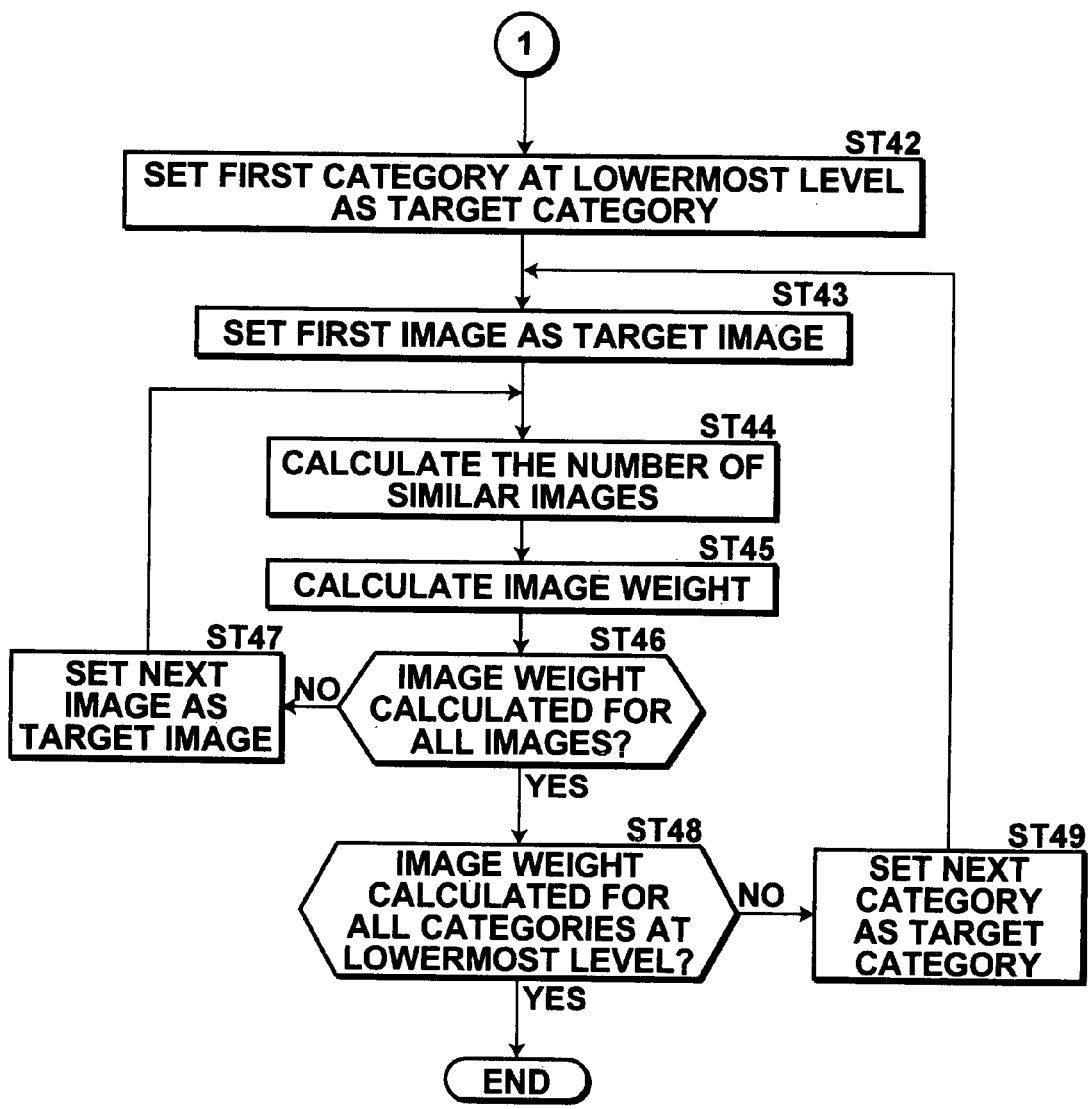
FIG. 15 is a flow chart showing procedures carried out in the third embodiment (part 2)

Procedures carried out in the third embodiment will be described below. FIGS. 14 and 15 are flow charts showing the procedures in the third embodiment. Image data have been read from a memory card 2 and stored in a folder desired by a user in a hard disc 24. A CPU 12 starts processing when the user inputs an instruction to set weights from an input unit 16. An image classification unit 28 classifies images into categories (Step ST31).

The category abnormality calculation unit 36 then sets, as a target category, the first category at the uppermost level in which the image having the oldest photography time and date is stored (Step ST32), and calculates the abnormality of the target category (Step ST33). In this embodiment, the category abnormality calculation unit 36 calculates the abnormality for the target category by using statistical abnormality distributions in a relationship between the number of images therein and a total photography time thereof, and in a relationship between the number of images therein and a rate of similar images therein. Hereinafter, calculation of the abnormality will be described.

The category abnormality calculation unit 36 firstly calculates the number of images found by considering similar images, for the target category. Therefore, the category abnormality calculation unit 36 carries out similar image judgment processing in the same manner as the category weight calculation unit 30 in the first embodiment. Likewise, the category abnormality calculation unit 36 also calculates the number of images found by considering similar images, by regarding images that are similar to each other as similar images. The category abnormality calculation unit 36 further calculates the rate of similar images in the target category and the total photography time thereof.

Figure 16A:
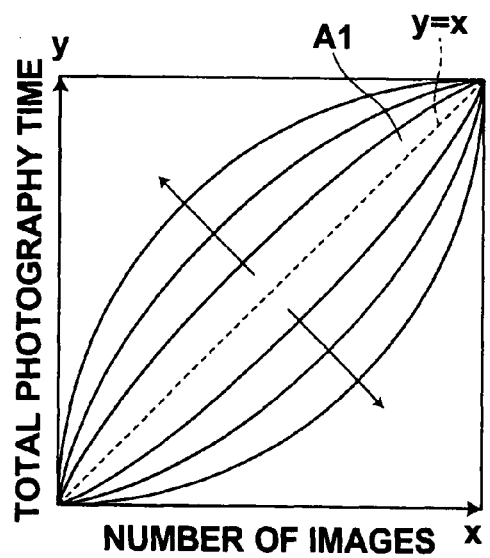
FIGS. 16A and 16B respectively show a statistical abnormality distribution B1 in a two-dimensional coordinate system defining a relationship between the number of images and a total photography time of a category and a statistical abnormality distribution B2 in a two-dimensional coordinate system defining a relationship between the number of images and a rate of similar images.
Figure 16B:
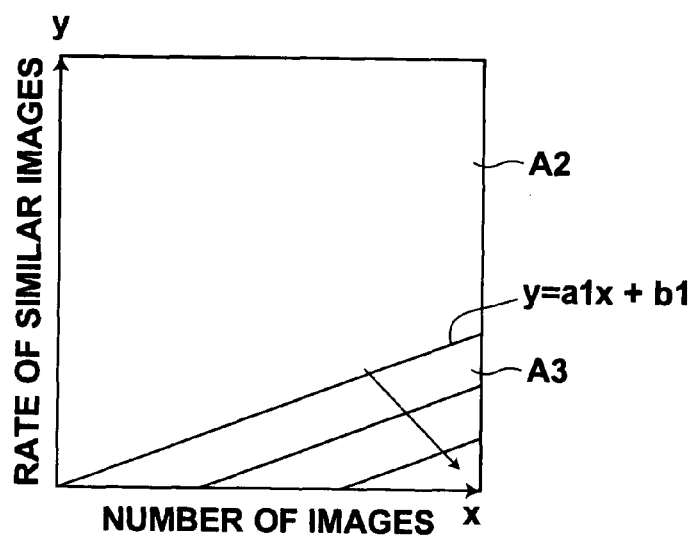

The category abnormality calculation unit 36 calculates the category abnormality by referring to a statistical abnormality distribution B1 in a two-dimensional coordinate system defining the relationship between the number of images and the total photography time and by referring to a statistical abnormality distribution B2 in a two-dimensional coordinate system defining the relationship between the number of images and the rate of similar images. FIGS. 16A and 16B respectively show the statistical abnormality distributions B1 and B2.

The distribution B1 has been obtained by plotting values of photography abnormality in the two-dimensional coordinate system whose vertical and horizontal axes respectively represent the number of images and the total photography time having various values for a plurality of sample categories regarding which the values of photography abnormality has been known to range from 0 to 1 in advance. More specifically, in the distribution B1, the abnormality is 0 in a predetermined region A1 centered around a function y=x in the two-dimensional coordinate system whose x and y axes respectively represent the number of images and the total photography time. The abnormality is distributed in such a manner that the values of the abnormality become larger as the distribution spreads farther from the region A1.

The distribution B2 has been obtained by plotting values of abnormality in the two-dimensional coordinate system whose vertical and horizontal axes respectively represent the number of images and the rate of similar images having various values for a plurality of sample categories regarding which a degree of failure of image classification has been known to take values ranging from 0 to 1 in advance. More specifically, in the distribution B2, the abnormality is 0 in a region A2 satisfying y≧a1x+b1 in the two-dimensional coordinate system whose x and y axes respectively represent the number of images and the rate of similar images. The abnormality is distributed in such a manner that the values of the abnormality increase as the values of y decrease in a region A3 satisfying y<a1x+b1.

The distributions B1 and B2 have been stored as tables in the hard disc 24.

The category abnormality calculation unit 36 calculates a first abnormality H1 and a second abnormality H2 by referring to the distributions B1 and B2. The category abnormality calculation unit 36 then finds an abnormality H0 of the target category according to Equation (5) below, based on the first and second abnormalities H1 and H2:

$$H0=1-(1-H1)\times(1-H2) \quad (5)$$

The category abnormality calculation unit 36 classifies the target category as an abnormal category in the case where the calculated abnormality H0 is equal to or greater than a threshold value Th1, and classifies the target category as a normal category if otherwise (Step ST34).

A category weight calculation unit 30 then judges whether the target category is at the uppermost level (Step ST35). If a result at Step ST35 is affirmative, characteristic quantities of the target category are calculated in the same manner as in the first embodiment (Step ST36).

The category weight calculation unit 30 calculates the number of images in the target category found by considering similar images therein as a first characteristic quantity T1, and also finds the total photography time thereof and the rate of similar images therein as a second characteristic quantity T2 and a third characteristic quantity T3, respectively. However, instead of calculating these characteristic quantities again, the number of images in the target category found by considering similar images therein, the total photography time thereof, and the rate of similar images therein calculated by the category abnormality calculation unit 36 may be used as the first to third characteristic quantities T1 to T3.

Thereafter, the category weight calculation unit 30 statistically calculates a category weight J0 as a weight of the target category, in the same manner as has been described above according to the characteristic quantities T1 to T5 (Step ST37).

If the result at ST35 is negative, the category weight calculation unit 30 judges whether an upper-level category above the target category is a normal category (Step ST38). If a result at Step St38 is affirmative, the flow of processing goes to Step ST36 for calculation of the category weight J0. If the result at Step ST38 is negative, a predetermined value is set as the category weight J0 (Step ST39).

The category weight calculation unit 30 then judges whether the weight J0 has been calculated for all the categories (Step ST40). If a result at Step ST40 is negative, the next category is set as the target category (Step ST41), and the flow of processing returns to Step ST33. Thereafter, the procedures from Step ST33 are repeated.

If the result at Step ST40 is affirmative, an image weight calculation unit 32 calculates an image weight as a weight of each of the images in the categories at a lowermost level. The image weight calculation unit 32 sets a first category at the lowermost level as a target category (Step ST42), and sets a first image (such as the image having the newest photography time and date) in the target category as a target image (Step ST43). The image weight calculation unit 32 then calculates the number of images similar to the target image in the same category (Step ST44). The image weight calculation unit 32 thereafter calculates an image weight G0 (Step ST45).

The image weight calculation unit 32 judges whether the image weight G0 has been calculated for all images in the target category (Step ST46). If a result at Step ST46 is negative, the next image is set to be the target image (Step ST47), and the flow of processing returns to Step ST44. Thereafter, the procedures from Step ST44 are repeated.

If the result at Step ST46 is affirmative, whether the image weight G0 has been calculated for all the categories at the lowermost level is judged (Step ST48). If a result at Step ST48 is negative, the next category at the lowermost level is set as the target category (Step ST49), and the flow of processing returns to Step ST43. Thereafter, the procedures from Step ST43 are repeated. If the result at Step ST48 is affirmative, the procedures end.

Figure 17:
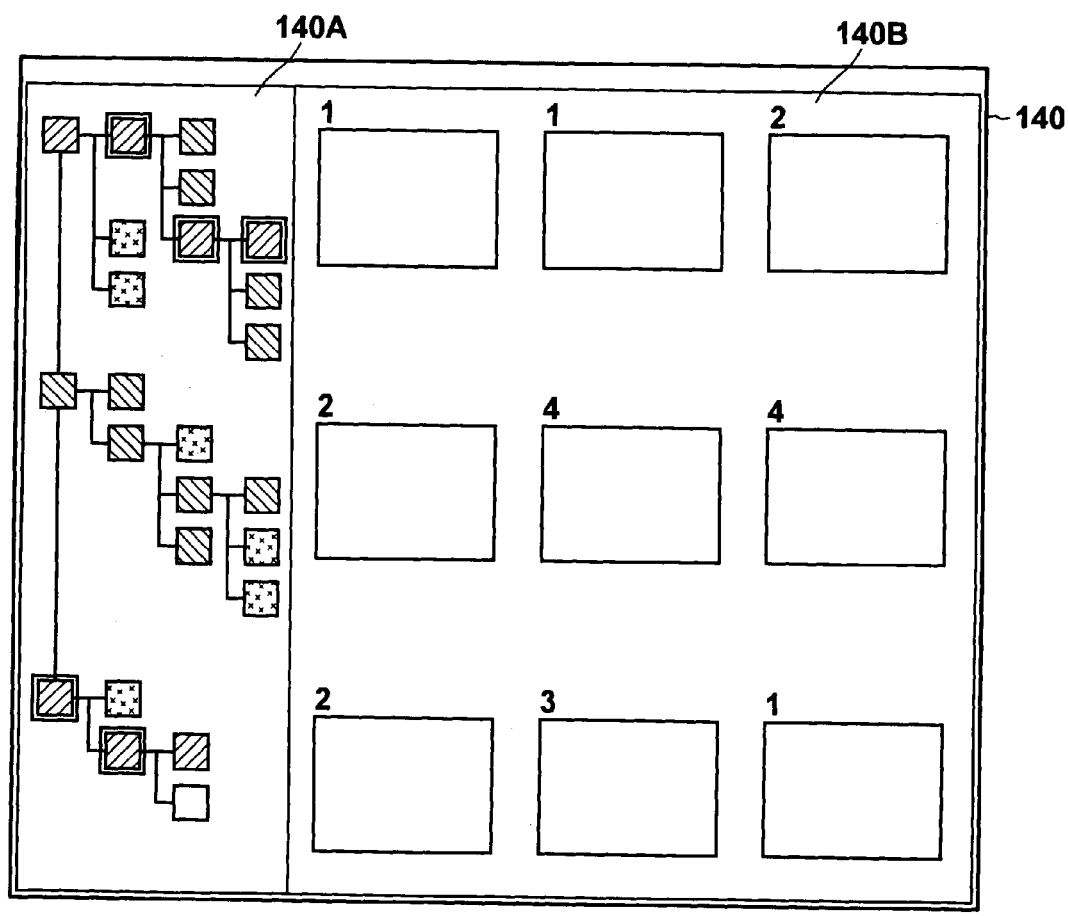
FIG. 17 shows an example of an image catalog screen in the third embodiment.

After the category weight J0 and the image weight G0 have been calculated in the above manner, a display control unit 34 displays on a display unit 18 an image catalog screen wherein the weight J0 set by the category weight calculation unit 30 can be recognized visually. FIG. 17 shows an example of the image catalog screen in the third embodiment. As shown in FIG. 17, an image catalog screen 140 in the third embodiment has a folder area 140A showing a structure of folders stored in the hard disc 24 and a catalog display area 140B wherein a catalog of thumbnails are displayed regarding the images stored in a selected one of the folders in the folder area 140A.

The hierarchical structure of the folders corresponding to the categories classified in the above manner is shown in the folder area 140A. The display control unit 34 ranks the categories $1^{st}$ to $4^{th}$ according to the weight J0 calculated by the category weight calculation unit 30, and displays the folder structure in the folder area 140A by coloring the folders according to the ranks. For example, the folders ranked $1^{st}$ are colored in pink while the folders ranked $2^{nd}$ are colored in orange. Likewise, the $3^{rd}$ place folders are shown in yellow while the $4^{th}$ place folders are displayed in green. In addition, by framing the folders corresponding to the abnormal categories, it can be understood that the folders correspond to the abnormal categories.

By selecting a desired one of the folders in the folder area 140A, the catalog of the thumbnails of the images classified in the selected folder can be displayed in the catalog display area 140B. In the catalog display area 140B, a rank of each of the images is displayed on the upper left of the corresponding thumbnail according to the weight G0 thereof.

Figure 18:
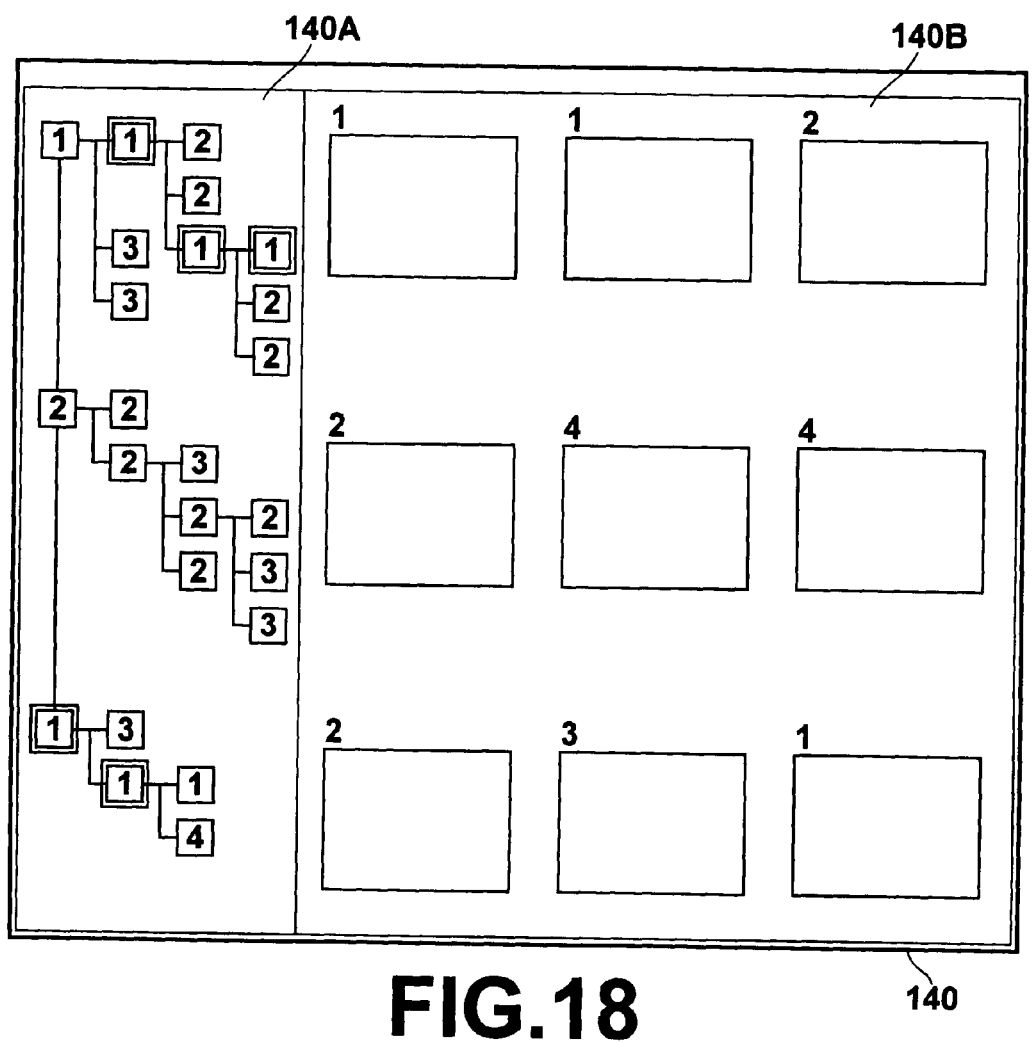
FIG. 18 shows another example of the image catalog screen in the third embodiment.

For display may be used not only coloring according to the weight as shown in FIG. 17 but also the ranks as values as shown in FIG. 18. In addition, a mark or graph according to the weight of each of the categories or the images may also be displayed.

As has been described above, according to the third embodiment, the abnormality of each of the categories is calculated by referring to the statistical abnormality distributions in the relationships of the number of images therein to the total photography time thereof and to the rate of similar images therein. Therefore, whether image classification in each of the categories is normal can be understood easily.

Especially, by classifying each of the categories as the normal category or the abnormal category by comparison of the abnormality thereof with the predetermined threshold value, whether image classification in each of the categories is normal can be understood more easily.

In the third embodiment, the abnormality H0 is calculated by using the first and second abnormalities H1 and H2 according to Equation (5). However, the abnormality H0 may be calculated only from the abnormality H1 or H2. More specifically, the abnormality H0 may be calculated as H0=(1−H1) or H0=(1−H2).

In the third embodiment, the category weight is calculated based on the 5 characteristic quantities T1 to T5, namely the number of images in each of the categories found by considering similar images therein, the total photography time thereof, the rate of similar images therein, the rate of human images therein, and the average number of human faces therein. However, not all of the 5 characteristic quantities are necessarily used, and the weight of each of the categories may be found by use of at least one of the 5 characteristic quantities T1 to T5.

In the third embodiment, the category weight calculation unit 30 calculates the category weight J0 through calculation of the 5 characteristic quantities T1 to T5, namely the number of images in each of the categories found by considering similar images therein, the total photography time thereof, the rate of similar images therein, the rate of human images therein, and the average number of human faces therein. However, the category weight calculation unit 30 may calculate, as a characteristic quantity or characteristic quantities, at least one of the number of images in each of the categories, the number of images in an upper-level category, the number of categories related thereto, the number of lower-level categories, and the number of levels from an uppermost level to the level thereof. The weight of each of the categories is then calculated by weighted addition of each of the characteristic quantity or quantities. The weight of each of the categories may be calculated for combinations of the characteristic quantity or quantities and the 5 characteristic quantities T1 to T5, namely the number of images found therein by considering similar images therein, the total photography time thereof, the rate of similar images therein, the rate of human images therein, and the average number of human faces therein.

In the third embodiment, the abnormality is calculated by using the tables representing the statistical abnormality distribution B1 in the two-dimensional coordinate system defining the relationship between the number of images and the total photography time of the target category and the statistical abnormality distribution B2 in the two-dimensional coordinate system defining the relationship between the number of images and the rate of similar images. However, the number of images is correlated to the number of images found by considering similar images, to the number of related categories, and to the number of hierarchical levels of the categories into which the images are classified. Therefore, the abnormality may be calculated by using a statistical abnormality distribution in a two-dimensional coordinate system defining a relationship between the total photography time of the category and any one of the number of images found by considering similar images, the number of related categories, and the number of hierarchical levels represented by a horizontal axis, or by using a table representing a statistical abnormality distribution in a two-dimensional coordinate system defining a relationship between the rate of similar images and any one of these.

Figure 19:
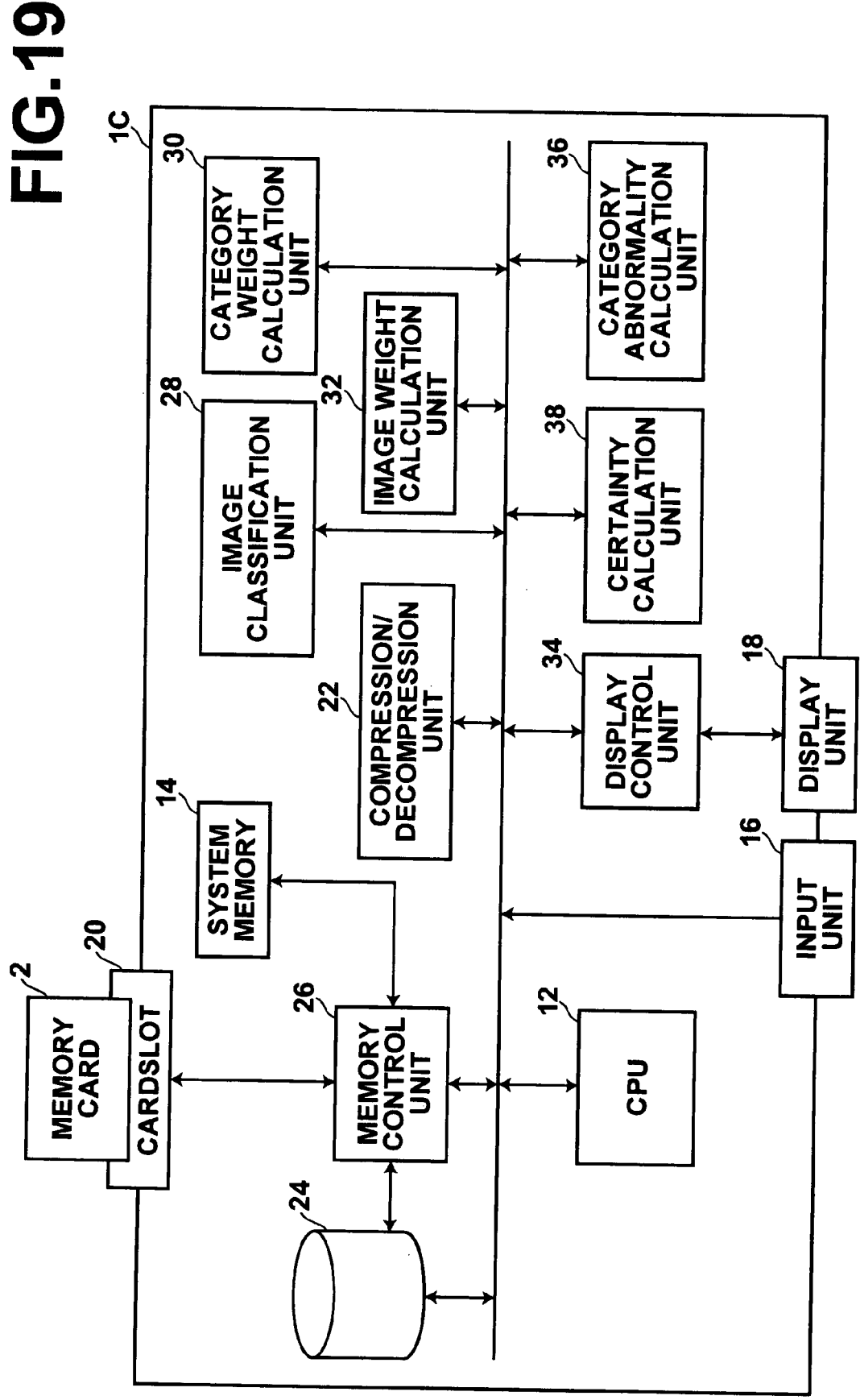
FIG. 19 is a block diagram showing the configuration of a weight setting apparatus of a fourth embodiment of the present invention.

A fourth embodiment of the present invention will be described next. FIG. 19 is a block diagram showing the configuration of a weight setting apparatus of the fourth embodiment of the present invention. In the fourth embodiment, the same elements as in the third embodiment have the same reference codes, and detailed description thereof is omitted. A weight setting apparatus 1C in the fourth embodiment is different from the third embodiment in that the apparatus has a certainty calculation unit 38 for calculating a category certainty based on an abnormality calculated by a category abnormality calculation unit 36 and in that the category abnormality calculation unit 36 does not classify categories into normal categories and abnormal categories.

Figure 20:
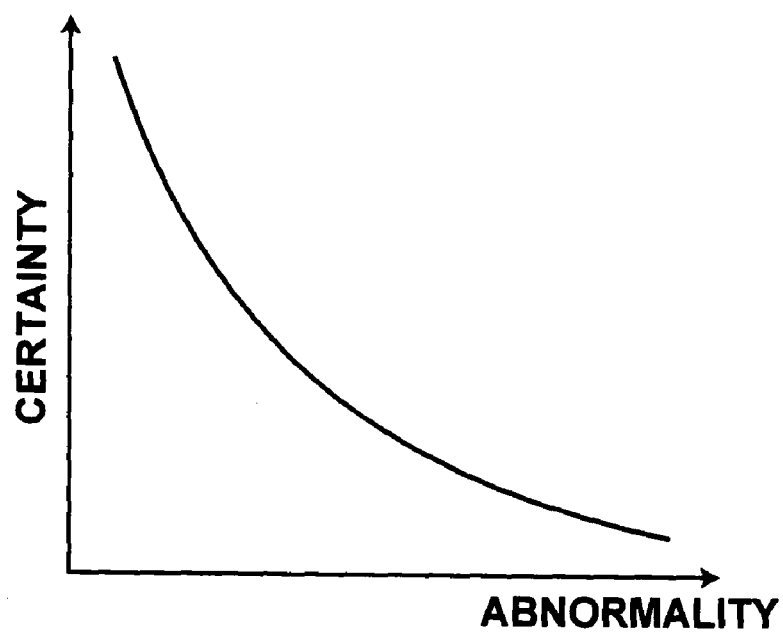
FIG. 20 is a table showing a relationship between an abnormality and a certainty.

The certainty calculation unit 38 calculates the certainty of a target category based on an abnormality H0 thereof calculated by the category abnormality calculation unit 36. More specifically, the certainty calculation unit 38 finds the certainty by referring to a statistically calculated table representing a relationship between the abnormality and the certainty. FIG. 20 is a table representing the relationship. As shown in FIG. 20, the certainty is calculated from the abnormality in this table so as to lower the certainty as the abnormality grows. In this embodiment, the certainty takes a value ranging from 0 to 1, and image classification into the category becomes abnormal as the value increases.

Figure 21:
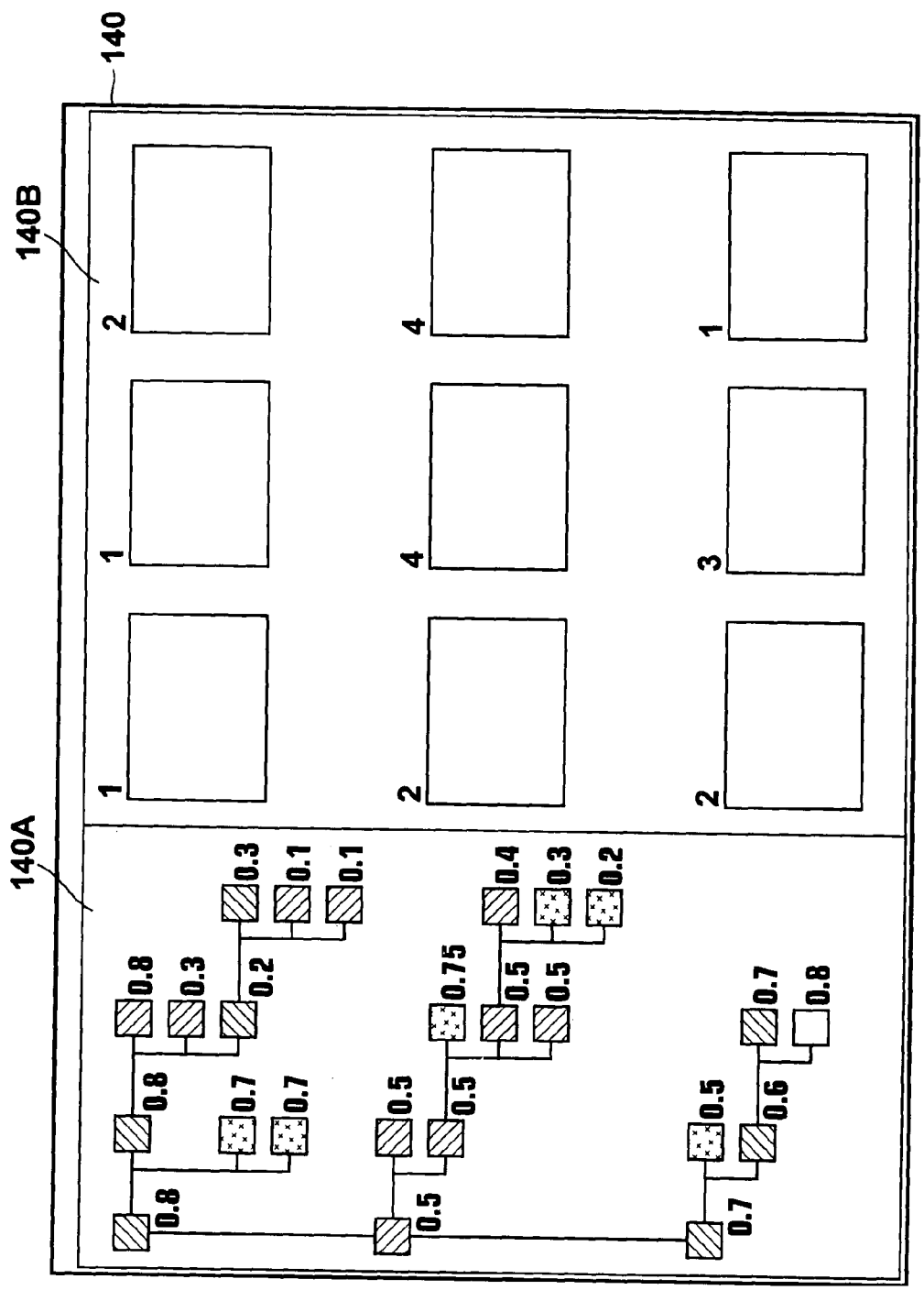
FIG. 21 shows an example of an image catalog screen in the fourth embodiment.

In the fourth embodiment, the certainty is calculated for the category in this manner, and a value representing the certainty is displayed to a folder displayed in a folder area 140A in an image catalog screen, as shown in FIG. 21. In this manner, how reliable a calculated weight of the category is can be easily known.

In the third and fourth embodiments, whether the category to which each of the images belongs is a normal category or an abnormal category may be judged before the image weight calculation unit 32 calculates the weight of the image. In this case, the image weight calculation unit 32 calculates the image weight G0 according to Equation (4) above in the case of normal category or by letting J0=0 in Equation (4) in the case of abnormal category.

Although the embodiments of the present invention have been described above, a program causing a computer to function as means corresponding to the image classification unit 28, the category weight calculation unit 30, the image weight calculation unit 32, and the category abnormality calculation unit 36, for causing the computer to carry out the procedures shown in FIG. 2 or in FIGS. 14 and 15 is also an embodiment of the present invention. In addition, a computer-readable recording medium storing the program is another embodiment of the present invention. The program may be incorporated into viewer software for image viewing.

What is claimed is:

1. A category weight setting apparatus, comprising:
category weight calculation means for statistically calculating a weight of each category obtained by classification of a plurality of images, based on characteristic quantities comprising a number of images therein found by considering similar images therein, a total photography time thereof, a rate of similar images therein, a rate of human images therein, and an average number of human faces therein.

2. The category weight setting apparatus according to Claim 1,
the category weight calculation means calculating at least two of the characteristic quantities comprising the number of images therein found by considering similar images therein, the total photography time thereof, the rate of similar images therein, the rate of human images therein, and the average number of human faces therein,
the category weight calculation means statistically calculating individual weights corresponding to the characteristic quantities based on the characteristic quantities, and
the category weight calculation means calculating the category weight by weighting the individual weights.

3. An image weight setting apparatus, comprising:
category weight calculation means for statistically calculating a weight of each of categories obtained by classification of a plurality of images; and
image weight calculation means for statistically calculating a weight of each of the images included in a targeted one of the categories, based on a number of similar images included therein and the weight of the targeted one of the categories thereof,
wherein the category weight calculation means statistically calculates the weight of each of the categories based on characteristic quantities comprising a number of images therein found by considering similar images therein, a total photography time thereof, a rate of similar images therein, a rate of human images therein, and an average number of human faces therein.

4. The image weight setting apparatus according to claim 3, wherein the image weight calculation means calculates the weight of each of the images in the target one of the categories according to $\alpha(n) \times$(the weight of the category)$+\beta(n)$ where n refers to the number of similar images therein and $\alpha(n)$ and $\beta(n)$ are statistically predetermined weight coefficients according to the number of similar images.

5. The image weight setting apparatus according to claim 3, the category weight calculation means calculating at least two of the characteristic quantities comprising the number of images therein found by considering similar images therein, the total photography time thereof, the rate of similar images therein, the rate of human images therein, and the average number of human faces therein,
the category weight calculation means statistically calculating individual weights corresponding to the characteristic quantities based on the characteristic quantities, and the category weight calculation means calculating the category weight by weighting the individual weights.

6. An image weight setting apparatus, comprising:
classification means for classifying a plurality of images into categories based on accompanying information added to the images;
category weight calculation means for statistically calculating a weight of each of the categories based on a characteristic of the images included therein; and
image weight calculation means for statistically calculating a weight of each of the images in a targeted one of the categories, based on a number of similar images included therein and the weight of the targeted one of the categories thereof,
wherein the image weight calculation means calculates the weight of each of the images in the target one of the categories according to $\alpha(n\times(\text{the weight of the category})+\beta(n)$ where n refers to the number of similar images therein and $\alpha(n)$ and $\beta(n)$ are statistically predetermined weight coefficients according to the number of similar images.

7. The image weight setting apparatus according to claim 6, the classification means classifying the images into the categories according to a date of photography based on information on a time and a date of photography added to each of the images,
the category weight calculation means statistically calculating the weight of each of the categories based on at least one of characteristic quantities comprising the number of images therein found by considering similar images therein, a total photography time thereof, a rate of similar images therein, a rate of human images therein, and an average number of human faces therein, and
the image weight calculation means statistically calculating the weight of each of the images in the targeted one of the categories based on the number of similar images therein and the weight of the targeted one of the categories thereof.

8. A category weight setting method, comprising:
statistically calculating a weight of each category obtained by classification of a plurality of images, as executed by a processing unit on a computer, based on characteristic quantities comprising a number of images therein found by considering similar images therein, a total photography time thereof, a rate of similar images therein, a rate of human images therein, and an average number of human faces therein.

9. An image weight setting method, comprising:
statistically calculating a weight of each category obtained by classification of a plurality of images, as executed by a processing unit on a computer; and
statistically calculating a weight of each of the images included in a targeted one of categories, based on a number of similar images included therein and the weight of the targeted one of the categories thereof,
wherein the category weight calculating statistically calculates the weight of each of the categories based on characteristic quantities comprising a number of images therein found by considering similar images therein, a total photography time thereof, a rate of similar images therein, a rate of human images therein, and an average number of human faces therein.

10. An image weight setting method, comprising:
classifying a plurality of images into categories based on accompanying information added to the images, as executed by a processing unit on a computer;
statistically calculating a weight of each of the categories based on a characteristic of the images included therein; and
statistically calculating a weight of each of the images in a targeted one of the categories, based on a number of similar images included therein and the weight of the targeted one of the categories thereof,
wherein the image weight calculating calculates the weight of each of the images in the targeted one of the categories according to $\alpha(n)\times(\text{the weight of the category})\beta(n)$ where n refers to the number of similar images therein and $\alpha(n)$ and $\beta(n)$ are statistically predetermined weight coefficients according to the number of similar images.

11. A non-transitory computer-readable storage medium storing an image processing computer program causing a computer to execute a category weight setting method, the non-transitory computer-readable storage medium comprising:
statistically calculating a weight of each category obtained by classification of a plurality of images, based on characteristic quantities comprising a number of images therein found by considering similar images therein, a total photography time thereof, a rate of similar images therein, a rate of human images therein, and an average number of human faces therein.

12. A non-transitory computer-readable storage medium storing an image processing computer program causing a computer to execute an image weight setting method, the non-transitory computer-readable storage medium comprising:
statistically calculating a weight of each category obtained by classification of a plurality of images; and
statistically calculating a weight of each of the images included in a targeted one of the categories, based on a number of similar images included therein and the weight of the targeted one of the categories thereof,
wherein the category weight calculating statistically calculates the weight of each of the categories based on characteristic quantities comprising a number of images therein found by considering similar images therein, a total photography time thereof, a rate of similar images therein, a rate of human images therein, and an average number of human faces therein.

13. A non-transitory computer-readable storage medium storing an image processing computer program causing a computer to execute an image weight setting method, the non-transitory computer-readable storage medium comprising:
classifying a plurality of images into categories based on accompanying information added to the images;
statistically calculating a weight of each of the categories based on a characteristic of the images included therein; and
statistically calculating a weight of each of the images in a targeted one of the categories, based on a number of similar images included therein and the weight of the targeted one of the categories thereof,
wherein the image weight calculating calculates the weight of each of the images in the targeted one of the categories according to $\alpha(n)\times(\text{the weight of the category})+\beta(n)$ where n refers to the number of similar images therein and $\alpha(n)$ and $\beta(n)$ are statistically predetermined weight coefficients according to the number of similar images.

14. A category abnormality setting apparatus, comprising:
category abnormality calculation means for calculating an abnormality of each of categories obtained by classification of a plurality of images, based on at least one of:

a first statistical abnormality distribution that indicates that a photography operation is unnatural in any one of a relationship of any one of a number of images therein to a total photography time thereof, a relationship of a number of images therein found by considering similar images therein to the total photography time thereof, a relationship of a number of categories related thereto to the total photography time thereof, and a relationship of a number of hierarchical levels to the total photography time thereof; and a second statistical abnormality distribution that indicates a degree of categorization failure of images in one of a relationship between a number of images in each category and a rate of similar images therein, a relationship between the number of images therein found by considering similar images therein and the rate of similar images therein, a relationship between the number of categories related thereto and the rate of similar images therein, and a relationship between the number of hierarchical levels and the rate of similar images therein, wherein the first statistical abnormality distribution is obtained by plotting values of one of the number of images in each category, the number of images found by considering similar images, the number of categories related thereto, and the number of hierarchical levels with respect to a plurality of sample categories for which these values and a degree of unnaturalness of photography operations are known as a numerical value of a first degree of abnormality in a two dimensional coordinate system having one of the values of one of the number of images in each category, the number of images found by considering similar images, the number of categories related thereto, and the number of hierarchical levels as a horizontal axis and the total photography time as a vertical axis, and wherein the second statistical abnormality distribution is obtained by plotting the values of one of the number of images in each category, the number of images found by considering similar images, the number of categories related thereto, and the number of hierarchical levels with respect to a plurality of sample categories for which these values and the degree of categorization failure of images are known as a numerical value of a second degree of abnormality in a two dimensional coordinate system having one of the values of one of the number of images in each category, the number of images found by considering similar images, the number of categories related thereto, and the number of hierarchical levels as the horizontal axis and the rate of similar images as the vertical axis.

15. The category abnormality setting apparatus according to claim 14, wherein the category abnormality calculation means classifies each of the categories as a normal category or an abnormal category by comparing the abnormality thereof with a predetermined threshold value.

16. The category abnormality setting apparatus according to claim 15, wherein, in a case where the categories are in a hierarchy, the apparatus further comprises category weight calculation means for calculating a category weight of an uppermost-level category based on a characteristic thereof and for calculating a category weight of a lower-level category other than the uppermost-level category based on a characteristic thereof in a case where the uppermost-level category is the normal category or for setting a predetermined value as the category weight of the lower-level category in a case where the uppermost-level category is the abnormal category.

17. The category abnormality setting apparatus according to claim 14, further comprising:
certainty calculation means for statistically calculating a certainty of the abnormality for each of the categories;
category weight calculation means for calculating a weight of each of the categories based on a characteristic thereof; and
output means for outputting the weight together with the certainty.

18. A category abnormality setting method, comprising:
calculating an abnormality of each category obtained by classification of a plurality of images, as executed by a processing unit on a computer, based on at least one of:
a first statistical abnormality distribution that indicates that a photography operation is unnatural in any one of a relationship of any one of a number of images therein to a total photography time thereof, a relationship of a number of images therein found by considering similar images therein to the total photography time thereof, a relationship of a number of categories related thereto to the total photography time thereof, and a relationship of a number of hierarchical levels to at least one of the total photography time thereof; and
a second statistical abnormality distribution that indicates a degree of categorization failure of images in any one of a relationship between a number of images in each category and a rate of similar images therein, a relationship between the number of images therein found by considering similar images therein and the rate of similar images therein, a relationship between the number of categories related thereto and the rate of similar images therein, and a relationship between the number of hierarchical levels and the rate of similar images therein,
wherein the first statistical abnormality distribution is obtained by plotting values of one of the number of images in each category, the number of images found by considering similar images, the number of categories related thereto, and the number of hierarchical levels with respect to a plurality of sample categories for which these values and a degree of unnaturalness of photography operations are known as a numerical value of a first degree of abnormality in a two dimensional coordinate system having one of the values of one of the number of images in each category, the number of images found by considering similar images, the number of categories related thereto, and the number of hierarchical levels as a horizontal axis and the total photography time as a vertical axis, and
wherein the second statistical abnormality distribution is obtained by plotting the values of one of the number of images in each category, the number of images found by considering similar images, the number of categories related thereto, and the number of hierarchical levels with respect to a plurality of sample categories for which these values and the degree of categorization failure of images are known as a numerical value of a second degree of abnormality in a two dimensional coordinate system having one of the values of one of the number of images in each category, the number of images found by considering similar images, the number of categories related thereto, and the number of hierarchical levels as the horizontal axis and the rate of similar images as the vertical axis.

19. A non-transitory computer-readable storage medium storing an image processing computer program causing a computer to execute a category abnormality setting method, the non-transitory computer-readable storage medium comprising:

calculating an abnormality of each category obtained by classification of a plurality of images, based on at least one of:

a first statistical abnormality distribution that indicates that a photography operation is unnatural in any one of a relationship of any one of a number of images therein to a total photography time thereof, a relationship of a number of images therein found by considering similar images therein to the total photography time thereof, a relationship of a number of categories related thereto to the total photography time thereof, and a relationship of a number of hierarchical levels to the total photography time thereof; and a second statistical abnormality distribution that indicates a degree of categorization failure of images in any one of a relationship between a number of images in each category and a rate of similar images therein, a relationship between the number of images therein found by considering similar images therein and the rate of similar images therein, a relationship between the number of categories related thereto and the rate of similar images therein, and a relationship between the number of hierarchical levels and the rate of similar images therein, wherein the first statistical abnormality distribution is obtained by plotting values of one of the number of images in each category, the number of images found by considering similar images, the number of categories related thereto, and the number of hierarchical levels with respect to a plurality of sample categories for which these values and a degree of unnaturalness of photography operations are known as a numerical value of a first degree of abnormality in a two dimensional coordinate system having one of the values of one of the number of images in each category, the number of images found by considering similar images, the number of categories related thereto, and the number of hierarchical levels as a horizontal axis and the total photography time as a vertical axis, and wherein the second statistical abnormality distribution is obtained by plotting the values of one of the number of images in each category, the number of images found by considering similar images, the number of categories related thereto, and the number of hierarchical levels with respect to a plurality of sample categories for which these values and the degree of categorization failure of images are known as a numerical value of a second degree of abnormality in a two dimensional coordinate system having one of the values of one of the number of images in each category, the number of images found by considering similar images, the number of categories related thereto, and the number of hierarchical levels as the horizontal axis and the rate of similar images as the vertical axis.

\* \* \* \* \*